United States Patent [19]

Haffner et al.

[11] Patent Number: 5,514,470

[45] Date of Patent: May 7, 1996

[54] COMPOSITE ELASTIC NECKED-BONDED MATERIAL

[75] Inventors: William B. Haffner, Kennesaw; Michael T. Morman, Alpharetta; Jack D. Taylor; Jon E. Tinsley, both of Roswell, all of Ga.

[73] Assignee: Kimberly-Clark Corporation, Neenah, Wis.

[21] Appl. No.: 453,535

[22] Filed: May 30, 1995

Related U.S. Application Data

[60] Division of Ser. No. 276,924, Jul. 19, 1994, which is a continuation-in-part of Ser. No. 89,869, Jul. 12, 1993, Pat. No. 5,336,545, which is a continuation of Ser. No. 452,154, Dec. 15, 1989, Pat. No. 5,226,992, which is a division of Ser. No. 248,518, Sep. 23, 1988, abandoned.

[51] Int. Cl.⁶ ..................................................... B32B 7/00
[52] U.S. Cl. .. 428/246; 156/289, 244.27; 428/198, 253, 252, 428/284; 428/286; 428/297; 428/298; 428/903
[58] Field of Search ......................... 428/284, 286, 428/297, 343, 355, 903 428/246, 252, 253, 118, 298, 156/229, 244.11, 244.27

[56] References Cited

U.S. PATENT DOCUMENTS

| | | | |
|---|---|---|---|
| 1,741,530 | 12/1929 | Mayer | 428/198 |
| 2,004,110 | 6/1935 | Head | 154/40 |
| 2,574,200 | 11/1951 | Teaque | 23/74 |
| 3,047,444 | 7/1962 | Harwood | 154/46 |
| 3,341,394 | 9/1967 | Kinney | 161/72 |
| 3,402,086 | 9/1968 | Smith et al. | 156/244 |
| 3,410,748 | 11/1968 | Blue | 161/76 |
| 3,421,960 | 1/1969 | Arbit | 156/244 |
| 3,485,695 | 12/1969 | Ness | 156/229 |
| 3,540,963 | 11/1970 | Dipner | 156/244 |
| 3,654,060 | 4/1972 | Goldman | 161/112 |
| 3,695,967 | 10/1972 | Ross | 156/209 |
| 3,932,682 | 1/1976 | Loft et al. | 428/296 |
| 4,013,816 | 3/1977 | Sabee et al. | 428/288 |
| 4,178,407 | 12/1979 | Rubens | 428/284 |
| 4,209,563 | 6/1980 | Sisson | 428/288 |
| 4,287,251 | 9/1981 | King et al. | 428/198 |
| 4,326,003 | 4/1982 | Bouhaniche | 428/198 |
| 4,342,812 | 8/1982 | Selwood | 428/286 |
| 4,443,511 | 4/1984 | Worden et al. | 428/198 |
| 4,443,513 | 4/1984 | Meitner et al. | 422/195 |
| 4,486,485 | 12/1984 | Sookne | 428/198 |
| 4,489,118 | 12/1984 | Endres et al. | 428/154 |

(List continued on next page.)

FOREIGN PATENT DOCUMENTS

| | | |
|---|---|---|
| 0019295 | 11/1980 | European Pat. Off. . |
| 0030418 | 6/1981 | European Pat. Off. . |
| 0127483 | 12/1984 | European Pat. Off. . |
| 0180703 | 5/1986 | European Pat. Off. . |
| 0237642 | 9/1987 | European Pat. Off. . |
| 0239080 | 9/1987 | European Pat. Off. . |
| 0370835 | 5/1990 | European Pat. Off. . |
| 2632875 | 11/1977 | Germany . |
| 2757526 | 6/1979 | Germany . |
| 3734963 | 4/1988 | Germany . |
| 648644 | 1/1951 | United Kingdom . |
| 1576436 | 10/1980 | United Kingdom . |

OTHER PUBLICATIONS

Muehlner, Roland O., "Kraton thermoplastic elastomer," *Modern Plastics Encyclopedia*, McGraw–Hill, vol. 51, No. 10A, pp. 115–116.

*Primary Examiner*—James J. Bell
*Attorney, Agent, or Firm*—Karl V. Sidor

[57] ABSTRACT

The present invention provides a composite elastic necked-bonded material including at least one necked material joined to at least one elastic sheet. The composite elastic necked-bonded material is stretchable in a direction generally parallel to the direction of constriction or necking of the necked material. Also disclosed is a method of producing a composite elastic necked-bonded material by extruding a film of substantially molten elastomer through a die tip; depositing the extruded elastomeric film onto a tensioned, necked material within from about 0.1 to about 1 second of exiting the die tip to form a multilayer material; and then immediately applying pressure to the multilayer material to bond the tensioned, necked material to the elastomeric film.

3 Claims, 12 Drawing Sheets

U.S. PATENT DOCUMENTS

| | | | |
|---|---|---|---|
| 4,489,543 | 12/1984 | Bromley et al. | 57/208 |
| 4,500,594 | 2/1985 | Credali et al. | 428/284 |
| 4,515,854 | 5/1985 | Kogame et al. | 428/288 |
| 4,543,099 | 9/1985 | Bunnelle et al. | 156/229 |
| 4,551,378 | 11/1985 | Carey, Jr. | 428/198 |
| 4,554,121 | 11/1985 | Kramers | 264/103 |
| 4,652,487 | 3/1987 | Morman | 428/138 |
| 4,657,802 | 4/1987 | Morman | 428/152 |
| 4,668,566 | 5/1987 | Braun | 428/286 |
| 4,677,695 | 7/1987 | VanGompel et al. | 2/79 |
| 4,692,368 | 9/1987 | Taylor et al. | 428/137 |
| 4,720,415 | 1/1988 | VanderWielen et al. | 428/152 |
| 4,726,976 | 2/1988 | Karami et al. | 428/137 |
| 4,775,579 | 10/1988 | Hagy et al. | 428/284 |
| 4,777,080 | 10/1988 | Harris, Jr. et al. | 428/212 |
| 4,781,966 | 11/1988 | Taylor | 428/152 |
| 4,789,699 | 12/1988 | Kieffer et al. | 524/271 |
| 4,801,482 | 1/1989 | Goggans et al. | 428/68 |
| 4,844,765 | 7/1989 | Reith | 156/306.6 |
| 4,929,492 | 5/1990 | Carey, Jr. et al. | 428/198 |
| 4,939,016 | 7/1990 | Radwanski et al. | 428/152 |
| 4,981,747 | 1/1991 | Morman | 428/198 |
| 5,169,706 | 12/1992 | Collier, IV et al. | 428/152 |
| 5,178,931 | 1/1993 | Perkins et al. | 428/198 |
| 5,190,812 | 3/1993 | Joseph et al. | 428/297 |
| 5,208,098 | 5/1993 | Stover | 428/284 |
| 5,219,633 | 6/1993 | Sabee | 428/109 |
| 5,226,992 | 7/1993 | Morman | 156/62.4 |
| 5,229,191 | 7/1993 | Austin | 428/198 |
| 5,238,733 | 8/1993 | Joseph et al. | 428/284 |
| 5,288,349 | 2/1994 | Fink | 156/244 |
| 5,336,545 | 8/1994 | Morman | 428/152 |

A > B

COMPOSITE ELASTIC NECKED-BONDED MATERIAL

This application is a division of application Ser. No. 08/276,924 entitled "Composite Elastic Necked-Bonded Material" and filed in the U.S. Patent and Trademark Office on Jul. 19, 1994, which is a continuation-in-part of application Ser. No. 08/089,869 filed on Jul. 12, 1993 now U.S. Pat. No. 5,336,545, which is a continuation of application Ser. No. 07/452,154 filed on Dec. 15, 1989 U.S. Pat. No. 5,226,992, which is a division of application Ser. No. 07/248,518 filed on Sep. 23, 1988, now abandoned.

FIELD OF THE INVENTION

The present invention relates to elasticized materials and a method of making the same. Generally speaking, the present invention relates to a composite elastic material including at least one elastic sheet.

BACKGROUND OF THE INVENTION

Plastic nonwoven webs formed by nonwoven extrusion processes such as, for example, meltblowing processes and spunbonding processes may be manufactured into products and components of products so inexpensively that the products could be viewed as disposable after only one or a few uses. Representatives of such products include diapers, tissues, wipes, garments, mattress pads and feminine care products.

Some of the problems in this area are the provision of an elastic material which is resilient and flexible while still having a pleasing feel. One problem is the provision of an elastic material which does not feel plastic or rubbery. The properties of the elastic materials can be improved by forming a laminate of an elastic material with one or more nonelastic material on the outer surface which provide better tactile properties.

Nonwoven webs formed from nonelastic polymers such as, for example, polypropylene are generally considered nonelastic. The lack of elasticity usually restricts these nonwoven web materials to applications where elasticity is not required or desirable.

Composite materials of elastic and nonelastic material have been made by bonding the nonelastic material to the elastic material in a manner that allows the entire composite material to stretch or elongate so they can be used in garment materials, pads, diapers and feminine care products.

In one such composite material, a nonelastic material is joined to an elastic material while the elastic material is in a stretched condition so that when the elastic material is relaxed, the nonelastic material gathers between the locations where it is bonded to the elastic material. The resulting composite elastic material is stretchable to the extent that the nonelastic material gathered between the bond locations allows the elastic material to elongate. An example of this type of composite material is disclosed, for example, by Vander Wielen et al. U.S. Pat. No. 4,720,415, issued Jan. 19, 1988.

DEFINITIONS

The term "elastic" is used herein to mean any material which, upon application of a biasing force, is stretchable, that is, elongatable, to a stretched, biased length which is at least about 160 percent of its relaxed unbiased length, and which, will recover at least 55 percent of its elongation upon release of the stretching, elongating force. A hypothetical example would be a one (1) inch sample of a material which is elongatable to at least 1.60 inches and which, upon being elongated to 1.60 inches and released, will recover to a length of not more than 1.27 inches. Many elastic materials may be stretched by much more than 60 percent of their relaxed length, for example, 100 percent or more, and many of these will recover to substantially their original relaxed length, for example, to within 105 percent of their original relaxed length, upon release of the stretching force.

As used herein, the term "nonelastic" refers to any material which does not fall within the definition of "elastic," above.

As used herein, the term "recover" refers to a contraction of a stretched material upon termination of a biasing force following stretching of the material by application of the biasing force. For example, if a material having a relaxed, unbiased length of one (1) inch is elongated 50 percent by stretching to a length of one and one half (1.5) inches the material would be elongated 50 percent (0.5 inch) and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its one-half (0.5) inch elongation. Recovery may be expressed as [(maximum stretch length–final sample length)/(maximum stretch length–initial sample length)]×100.

As used herein, the term "nonwoven web" means a web that has a structure of individual fibers or threads which are interlaid, but not in an identifiable, repeating manner. Nonwoven webs have been, in the past, formed by a variety of processes such as, for example, meltblowing processes, spunbonding processes and bonded carded web processes.

As used herein, the term "microfibers" means small diameter fibers having an average diameter not greater than about 100 microns, for example, having a diameter of from about 0.5 microns to about 50 microns, more particularly, microfibers may have an average diameter of from about 4 microns to about 40 microns.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in Butin U.S. Pat. No. 3,849,241, the disclosure of which is hereby incorporated by reference.

As used herein, the term "spunbonded fibers" refers to small diameter fibers which are formed by extruding a molten thermoplastic material as filaments from a plurality of fine, usually circular, capillaries of a spinnerette with the diameter of the extruded filaments then being rapidly reduced as by, for example, eductive drawing or other well-known spunbonding mechanisms. The production of spunbonded nonwoven webs is illustrated in patents such as, for example, in Appel et al. U.S. Pat. No. 4,340,563, and Dorschner et al. U.S. Pat. No. 3,692,618. The disclosures of both these patents are hereby incorporated by reference.

As used herein, the term "interfiber bonding" means bonding produced by entanglement between individual fibers to form a coherent web structure without the use of thermal bonding. This fiber entangling is inherent in the meltblown processes but may be generated or increased by processes such as, for example, hydraulic entangling or needlepunching. Alternatively and/or additionally, a bonding agent can be utilized to increase the desired bonding and to maintain structural coherency of a fibrous web. For example, powdered bonding agents and chemical solvent bonding may be used.

As used herein, the term "sheet" means a layer which may either be a film or a nonwoven web.

As used herein, the term "necked material" refers to any material which has been narrowed in at least one dimension by application of a tensioning force.

As used herein, the term "neckable material" means any material which can be necked.

As used herein, the term "percent neckdown" refers to the ratio determined by measuring the difference between the un-necked dimension and the necked dimension of the neckable material and then dividing that difference by the un-necked dimension of the neckable material.

As used herein, the term "composite elastic necked-bonded material" refers to a material having an elastic sheet joined to a necked material at least at two places. The elastic sheet may be joined to the necked material at intermittent points or may be completely bonded thereto. The joining is accomplished while the elastic sheet and the necked material are in juxtaposed configuration. The composite elastic necked-bonded material is elastic in a direction generally parallel to the direction of neckdown of the necked material and may be stretched in that direction to the breaking point of the necked material. A composite elastic necked-bonded material may include more than two layers. For example, the elastic sheet may have necked material joined to both of its sides so that a three-layer composite elastic necked-bonded material is formed having a structure of necked material/elastic sheet/necked material. Additional elastic sheets and/or necked material layers may be added. Yet other combinations of elastic sheets and necked materials may be used.

As used herein, the term "palindromic laminate" means a multilayer laminate, for example, a composite elastic necked-bonded material which is substantially symmetrical. Exemplary palindromic laminates would have layer configurations of A/B/A, A/B/B/A, A/A/B/B/A/A, etc. Exemplary non-palindromic laminates would have layer configurations of A/B/C, A/B/C/A, A/C/B/D, etc.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, solvents, particulates and materials added to enhance processability of the composition.

SUMMARY OF THE INVENTION

In accordance with the present invention there is provided a a method of producing a composite elastic necked-bonded material including one or more layers of necked material joined to one or more layers of elastic sheet. The method includes the following steps: 1) applying a tensioning force to at least one neckable material to neck the material; and 2) joining the tensioned, necked material to at least one elastic sheet at least at two locations.

The elastic sheet and the tensioned, necked material may be joined by overlaying the materials and applying heat and/or pressure to the overlaid materials. Alternatively, the layers may be joined by using other bonding methods and materials such as, for example, adhesives, pressure sensitive adhesives, ultrasonic welding, high energy electron beams, and/or lasers. In one aspect of the present invention, the elastic sheet may be formed directly on the necked material utilizing processes, such as, for example, meltblowing processes and film extrusion processes.

When an elastic sheet is formed directly on the necked material utilizing film extrusion processes, the method of the present invention may include the following steps: 1) providing a continuously advancing tensioned, necked material; 2) extruding a film of substantially molten elastomer through a die tip; 3) depositing the extruded elastomeric film onto the tensioned, necked material within from about 0.1 to about 1 second of exiting the die tip to form a multilayer material; and 4) immediately applying pressure to the multilayer material to bond the tensioned, necked material to the elastomeric film.

Generally speaking, the tensioned, necked material may be material that was pre-necked and treated to remain in its necked condition (e.g., a reversibly necked material) or may be provided by applying a tensioning force to at least one neckable material to neck the material.

According to the invention, the film of elastomer may be deposited onto the tensioned, necked material within from about 0.25 to about 0.5 seconds of exiting the die tip. For example, the film of elastomer is deposited onto the tensioned, necked material within from about 0.3 to about 0.45 seconds of exiting the die tip.

According to one aspect of the invention, the film of elastomer may be extruded at a temperature of from about 360° to about 540° F. For example, a film of elastomer may be extruded at a temperature of from about 390° to about 480° F. Desirably, the film of elastomer may be extruded at a temperature from about 400° to about 420° F.

Pressure is applied to bond the necked material to the elastomeric film. This pressure may be applied utilizing, for example, a pressure roll arrangement. The pressure roll arrangement may include at least a first roll and a second roll configured to provide a gap between the rolls. Generally speaking, the gap setting between the first and second rolls of the pressure roll arrangement is large enough so that the force required to extend the resulting composite elastic material on the first pull is at least about 25 percent less than the force required to extend an identical composite elastic material prepared in an identical pressure roll arrangement with the pressure rolls in substantial bonding contact.

Alternatively, and/or additionally, pressure applied to bond the necked material to the extruded elastomeric film may be generated by the tensioning force on the tensioned, necked material as the elastomeric film is temporarily configured between a layer of tensioned, necked material and a roller or surface (e.g., a protruding roller or protruding surface).

The elastomeric film may be a film of elastomeric pressure sensitive elastomer adhesive. The elastomeric pressure sensitive elastomer adhesive may be formed from a blend including an elastomeric polymer and a tackifying resin.

The present invention also encompasses a composite elastic material produced by the method described above.

According to one aspect of the present invention, the method of producing a composite elastic necked-bonded material including one or more layers of necked material joined to one or more layers of elastic sheet includes the following steps: 1) providing a first and second continuously advancing sheet, each sheet being composed of at least one tensioned, necked material and each sheet advancing in intersecting relationship to form a contact zone; 2) extruding a film of substantially molten elastomer through a die tip between the first and second continuously advancing sheet of tensioned, necked material so that the extruded elastomeric film is deposited into the contact zone within from about 0.1 to about 1 second of exiting the die tip to form a multilayer material; and 3) immediately applying pressure to the multilayer material to bond each tensioned, necked material to the elastomeric film.

Generally speaking, the first and second continuously advancing sheets of tensioned, necked material may be material that was pre-necked and treated to remain in its necked condition (e.g., a reversibly necked material) or may be provided by applying a tensioning force to at least one neckable material to neck the material.

According to the invention, the film of elastomer may be deposited onto the tensioned, necked material within from about 0.25 to about 0.5 seconds of exiting the die tip. For example, the film of elastomer is deposited onto the tensioned, necked material within from about 0.3 to about 0.45 seconds of exiting the die tip.

In an aspect of the invention, the film of elastomer may be extruded at a temperature of from about 360° to about 540° F. For example, a film of elastomer may be extruded at a temperature of from about 390° to about 480° F. Desirably, the film of elastomer may be extruded at a temperature from about 400° to about 420° F.

Pressure is applied to bond the necked material to the elastomeric film. This pressure may be applied utilizing, for example, a pressure roll arrangement. The pressure roll arrangement may include at least a first roll and a second roll configured to provide a gap between the rolls. One or both of the first and second roll may be a smooth roll. Generally speaking, the gap setting between the first and second rolls of the pressure roll arrangement is large enough so that the force required to extend the resulting composite elastic material on the first pull is at least about 25 percent less than the force required to extend an identical composite elastic material prepared in an identical pressure roll arrangement with the pressure rolls in substantial bonding contact. For example, the method of the present invention may be practiced with the gap setting between the pressure rollers at about 15 mils to about 125 mils. As a further example, the method of the present invention may be practiced with the gap setting between the pressure rollers at about 30 mils to about 100 mils. Desirably, the method of the present invention is be practiced with the gap setting between the pressure rollers at about 40 mils to about 65 mils.

Alternatively, and or additionally, pressure applied to bond the necked material to the elastomeric film may be generated by the tensioning force on the tensioned, necked material as the elastomeric film is temporarily configured between a layer of tensioned, necked material and a protruding roller.

The elastomeric film may be a film of elastomeric pressure sensitive elastomer adhesive. The pressure sensitive elastomer adhesive may be formed from a blend including an elastomeric polymer and a tackifying resin.

The present invention also encompasses a composite elastic material produced by the method described above.

The necked material used as a component of the composite elastic necked-bonded material is formed from a neckable material. If the material is stretchable, it may be necked by stretching in a direction generally perpendicular to the desired direction of neck-down. The neckable material may be any material that can be necked and joined to an elastic sheet. Such neckable materials include knitted and loosely woven fabrics, bonded carded webs, spunbonded webs or meltblown webs. The meltblown web may include meltblown microfibers. The neckable material may also have multiple layers such as, for example, multiple spunbonded layers and/or multiple meltblown layers. The neckable material may be made of polymers such as, for example, polyolefins. Exemplary polyolefins include polypropylene, polyethylene, ethylene copolymers and propylene copolymers.

The elastic sheet may be a pressure sensitive elastomer adhesive sheet. If the elastic sheet is nonwoven web of elastic fibers or pressure sensitive elastomer adhesive fibers, the fibers may be meltblown fibers. More particularly, the meltblown fibers may be meltblown microfibers.

Other aspects of this invention provide that the pressure sensitive elastomer adhesive sheet and necked material may be joined without the application of heat such as, for example, by a pressure bonder arrangement or by tensioned wind-up techniques.

DETAILED DESCRIPTION OF THE INVENTION

Figure 1:
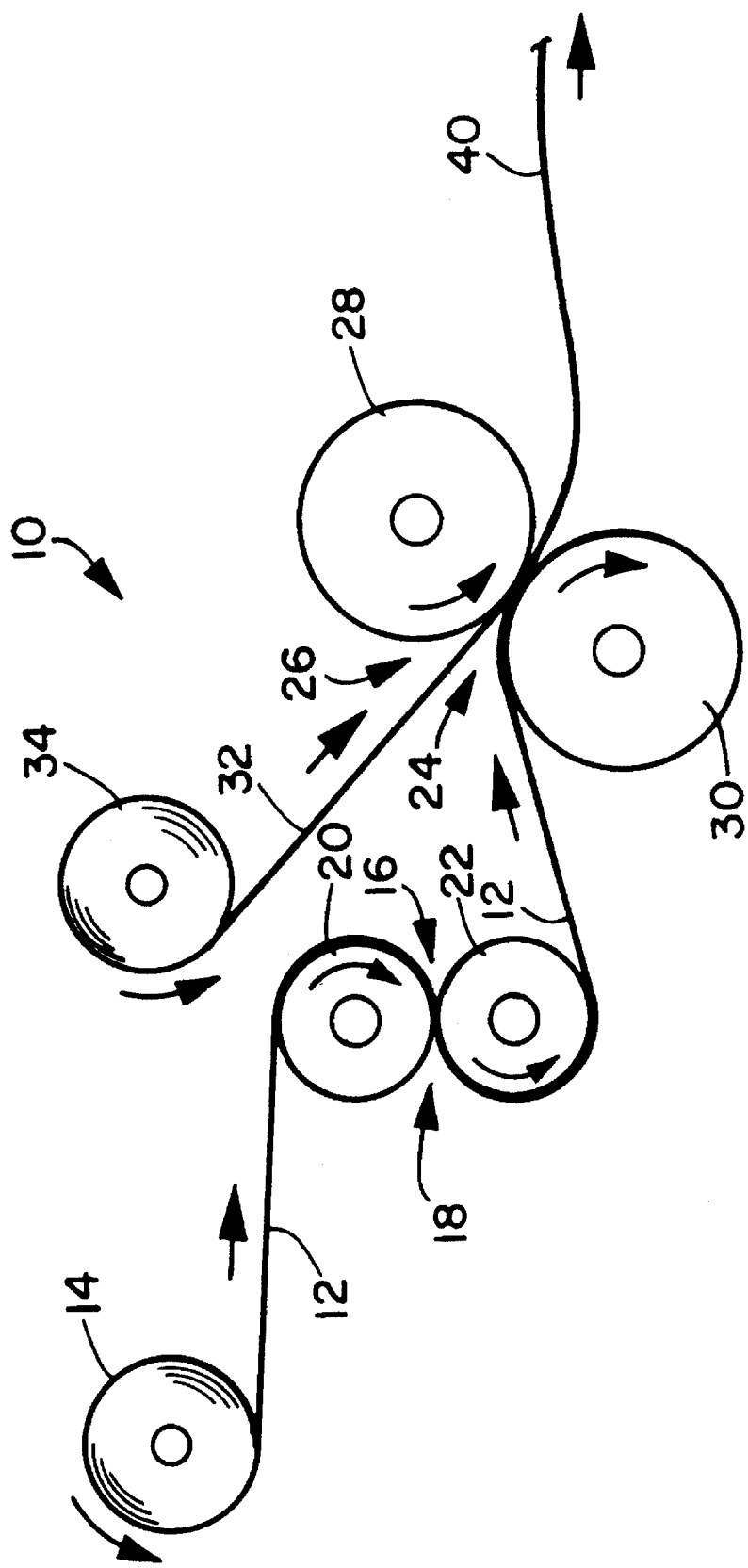
FIG. 1 is a schematic representation of an exemplary process for forming a composite elastic necked-bonded material.

Referring to FIG. 1 of the drawings there is schematically illustrated at 10 a process for forming a composite elastic necked-bonded material.

According to the present invention, a neckable material 12 is unwound from a supply roll 14 and travels in the direction indicated by the arrow associated therewith as the supply roll 14 rotates in the direction of the arrows associated therewith. The neckable material 12 passes through a nip 16 of the drive roller arrangement 18 formed by the drive rollers 20 and 22.

The neckable material 12 may be formed by known nonwoven extrusion processes, such as, for example, known meltblowing processes or known spunbonding processes, and passed directly through the nip 16 without first being stored on a supply roll.

An elastic sheet 32 is unwound from a supply roll 34 and travels in the direction indicated by the arrow associated therewith as the supply roll 34 rotates in the direction of the arrows associated therewith. The elastic sheet passes through the nip 24 of the bonder roller arrangement 26 formed by the bonder rollers 28 and 30. The elastic sheet 32 may be formed by extrusion processes such as, for example, meltblowing processes or film extrusion processes and passed directly through the nip 24 without first being stored on a supply roll.

The neckable material 12 passes through the nip 16 of the S-roll arrangement 18 in a reverse-S path as indicated by the rotation direction arrows associated with the stack rollers 20 and 22. From the S-roll arrangement 18, the neckable material 12 passes through the pressure nip 24 formed by a bonder roller arrangement 26. Because the peripheral linear speed of the rollers of the S-roll arrangement 18 is controlled to be less than the peripheral linear speed of the rollers of the bonder roller arrangement 26, the neckable material 12 is tensioned between the S-roll arrangement 18 and the pressure nip of the bonder roll arrangement 26. By adjusting the difference in the speeds of the rollers, the neckable material 12 is tensioned so that it necks a desired amount and is maintained in such tensioned, necked condition while the elastic sheet 32 is joined to the necked material 12 during their passage through the bonder roller arrangement 26 to form a composite elastic necked-bonded laminate 40.

Other methods of tensioning the neckable material 12 may be used such as, for example, tenter frames or other cross-machine direction stretcher arrangements that expand the neckable material 12 in other directions such as, for example, the cross-machine direction so that, after bonding to the elastic sheet 32, the resulting composite elastic necked-bonded material 40 will be elastic in a direction generally parallel to the direction of necking, i.e., in the machine direction.

The neckable material 12 may be a nonwoven material such as, for example, spunbonded web, meltblown web or bonded carded web. If the neckable material is a web of meltblown fibers, it may include meltblown microfibers. The neckable material 12 may be made of fiber forming polymers such as, for example, polyolefins. Exemplary polyolefins include one or more of polypropylene, polyethylene, ethylene copolymers, propylene copolymers, and butene copolymers. Useful polypropylenes include, for example, polypropylene available from the Himont Corporation under the trade designation PC-973, polypropylene available from the Exxon Chemical Company under the trade designation Exxon 3445, and polypropylene available from the Shell Chemical Company under the trade designation DX 5A09.

In one embodiment of the present invention, the neckable material 12 is a multi layer material having, for example, at least one layer of spunbonded web joined to at least one layer of meltblown web, bonded carded web or other suitable material. For example, neckable material 12 may be a multilayer material having a first layer of spunbonded polypropylene having a basis weight from about 0.2 to about 8 ounces per square yard (osy), a layer of meltblown polypropylene having a basis weight from about 0.2 to about 4 osy, and a second layer of spunbonded polypropylene having a basis weight of about 0.2 to about 8 osy. Alternatively, the neckable material 12 may be single layer of material such as, for example, a spunbonded web having a basis weight of from about 0.2 to about 10 osy or a meltblown web having a basis weight of from about 0.2 to about 8 osy.

The neckable material 12 may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, hydrocolloid (hydrogel) particulates commonly refered to as superabsorbant materials, occurs prior to collection of the meltblown fibers upon a collecting device to form a coherent web of randomly dispersed meltblown fibers and other materials such as disclosed in U.S. Pat. No. 4,100,324, the disclosure of which is hereby incorporated by reference.

If the neckable material 12 is a nonwoven web of fibers, the fibers should be joined by interfiber bonding to form a coherent web structure which is able to withstand necking. Interfiber bonding may be produced by entanglement between individual meltblown fibers. The fiber entangling is inherent in the meltblown process but may be generated or increased by processes such as, for example, hydraulic entangling or needlepunching. Alternatively and/or additionally a bonding agent may be used to increase the desired bonding.

The elastic sheet 32 may be made from any material which may be manufactured in sheet form. Generally, any suitable elastomeric fiber forming resins or blends containing the same may be utilized for the nonwoven webs of elastomeric fibers of the invention and any suitable elastomeric film forming resins or blends containing the same may be utilized for the elastomeric films of the invention.

For example, the elastic sheet 32 may be made from block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. The elastic sheet 32 may be formed from, for example, (polystyrene/poly(ethylenebutylene)/polystyrene) block copolymers available from the Shell Chemical Company under the trademark KRATON G. One such block copolymer may be, for example, KRATON G-1657.

Other exemplary elastomeric materials which may be used to form elastic sheet 32 include polyurethane elastomeric materials such as, for example, those available under the trademark ESTANE from B. F. Goodrich & Co., polyamide elastomeric materials such as, for example, those available under the trademark PEBAX from the Rilsan Company, and polyester elastomeric materials such as, for example, those available under the trade designation Hytrel from E. I. DuPont De Nemours & Company. Formation of elastic sheets from polyester elastic materials is disclosed in, for example, Morman et al. U.S. Pat. No. 4,741,949, hereby incorporated by reference.

A polyolefin may also be blended with the elastomeric polymer to improve the processability of the composition. The polyolefin must be one which, when so blended and subjected to an appropriate combination of elevated pressure and elevated temperature conditions, is extrudable, in blended form, with the elastomeric polymer. Useful blending polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothaene NA601 (also referred to herein as PE NA601 or polyethylene NA601). Two or more of the polyolefins may be utilized. Extrudable blends of elastomeric polymers and polyolefins are disclosed in, for example, Wisneski et al. U.S. Pat. No. 4,663,220, hereby incorporated by reference.

The elastic sheet 32 may also be a pressure sensitive elastomer adhesive sheet. For example, the elastic material itself may be tacky or, alternatively, a compatible tackifying resin may be added to the extrudable elastomeric compositions described above to provide an elastomeric sheet that can act as a pressure sensitive adhesive, e.g., to bond the elastomeric sheet to a tensioned, necked nonelastic web. In regard to the tackifying resins and tackified extrudable elastomeric compositions, note the resins and compositions as described in J. S. Keiffer and T. J. Wisneski U.S. Pat. No. 4,789,699, filed Oct. 15, 1986 for "Ambient Temperature Bondable Elastomeric Nonwoven Web", the disclosure of which is hereby incorporated by reference.

Any tackifier resin can be used which is compatible with the elastomeric polymer and can withstand the high processing (e.g., extrusion) temperatures. If blending materials such as, for example, polyolefins or extending oils are used, the tackifier resin should also be compatible with those blending materials. Generally, hydrogenated hydrocarbon resins are preferred tackifying resins, because of their better temperature stability. REGALREZ™ and ARKON™ P series tackifiers are examples of hydrogenated hydrocarbon resins. ZONATAKT™501 lite is an example of a terpene hydrocarbon. REGALREZ hydrocarbon resins are available from Hercules Incorporated. ARKON P series resins are available from Arakawa Chemical (U.S.A.) Incorporated. Of course, the present invention is not limited to use of such three tackifying resins, and other tackifying resins which are compatible with the other components of the composition and can withstand the high processing temperatures, can a 1 so be used.

A pressure sensitive elastomer adhesive may include, for example, from about 40 to about 80 percent by weight elastomeric polymer, from about 5 to about 40 percent polyolefin and from about 5 to about 40 percent resin tackifier. For example, a particularly useful composition included, by weight, about 61 to about 65 percent KRATON G-1657, about 17 to about 23 percent Polyethylene NA-601, and about 15 to about 20 percent REGALREZ 1126.

The elastic sheet 32 may also be a multilayer material in that it may include two or more individual coherent webs or films. Additionally, the elastic sheet 12 may be a multilayer material in which one or more of the layers contain a mixture of elastic and nonelastic fibers or particulates. An example of the latter type of elastic web, reference is made to U.S. Pat. No. 4,209,563, incorporated herein by reference, in which elastomeric and non-elastomeric fibers are commingled to form a single coherent web of randomly dispersed fibers. Another example of such a composite web would be one made by a technique such as disclosed in Richard A. Anderson et al. U.S. Pat. No. 4,100,324 issued Jul. 11, 1978, and also incorporated herein by reference. That patent discloses a nonwoven material which includes a mixture of meltblown thermoplastic fibers and other materials. The fibers and other materials are combined in the gas stream in which the meltblown fibers are borne so that an intimate entangled commingling of meltblown fibers and other materials, e.g., wood pulp, staple fibers or particulates such as, for example, hydrocolloid (hydrogel) particulates commonly referred to as super-absorbents occurs prior to collection of the fibers upon a collecting device to form a coherent web of randomly dispersed fibers.

The bonder roller arrangement 26 may be a smooth calender roller 28 and a smooth anvil roller 30 or may include a patterned calender roller, such as, for example, a pin embossing roller arranged with a smooth anvil roller. One or both of the calender roller and the smooth anvil roller may be heated and the pressure between these two rollers may be adjusted by well-known means to provide the desired temperature, if any, and bonding pressure to join the necked material 12 to the elastic sheet 32 forming a composite elastic necked-bonded material 40. The necked material and the elastic sheet may be completely bonded together and still provide a composite elastic necked-bonded material with good stretch properties. That is, a composite elastic material may be formed by joining a necked material to an elastic sheet utilizing bonding surfaces such as, for example, smooth rollers or platens to provide a high bond surface area. A composite elastic necked-bonded material 40 may also be formed utilizing a bonding pattern such as, for example, the sinusoidal bonding pattern shown in FIG. 5. That pattern has approximately 75 pins per square inch with each pin about 0.059 inches in diameter, providing a bond surface area of about 20.5 percent.

Necked materials may be joined to the elastic sheet 32 at least at two places by any suitable means such as, for example, thermal bonding or ultrasonic welding which softens at least portions of at least one of the materials, usually the elastic sheet because the elastomeric materials used for forming the elastic sheet 32 have a lower softening point than the components of the necked material 12. Joining may be produced by applying heat and/or pressure to the overlaid elastic sheet 32 and the necked material 12 by heating these portions (or the overlaid layer) to at least the softening temperature of the material with the lowest softening temperature to form a reasonably strong and permanent bond between the re-solidified softened portions of the elastic sheet 32 and the necked material 12.

Elastic sheets can be used having basis weights less than 0.5 osy (ounces per square yard), for example, from about 0.25 to about 0.4 osy. Such extremely low basis weight sheets are useful for economic reasons, particularly for use in disposable products. Additionally, elastic sheets having higher basis weights such as, for example, from about 0.5 to about 10 osy may also be used. used.

With regard to thermal bonding, one skilled in the art will appreciate that the temperature to which the materials, or at least the bond sites thereof, are heated for heat-bonding will depend not only on the temperature of the heated roll(s) or other heat sources but on the residence time of the materials on the heated surfaces, the basis weights of the materials and their specific heats and thermal conductivities. However, for a given combination of materials, and in view of the herein contained disclosure the processing conditions necessary to achieve satisfactory bonding can be readily determined by one of skill in the art.

Conventional drive means and other conventional devices which may be utilized in conjunction with the apparatus of FIG. 1 are well known and, for purposes of clarity, have not been illustrated in the schematic view of FIG. 1.

The relation between the original dimensions of the neckable material 12 to its dimensions after tensioning determines the approximate limits of stretch of composite elastic necked-bonded material. Because the neckable material 12 is able to stretch and return to its necked dimensions in directions such as, for example the machine direction or the cross-machine direction, the composite elastic necked-bonded material will be stretchable in generally the same direction as the neckable material 12.

Figure 2:
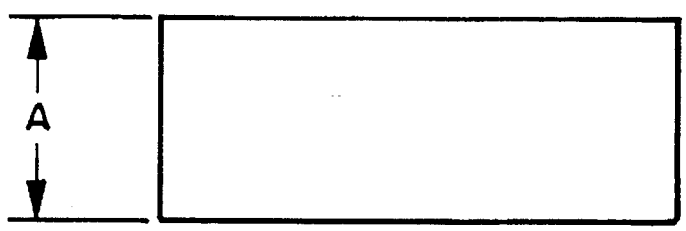
FIG. 2 is a plan view of an exemplary neckable material before tensioning and necking.
Figure 2A:
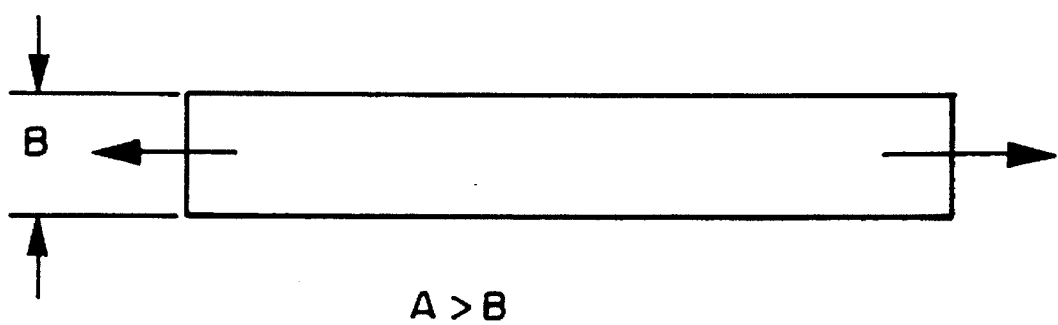
FIG. 2A is a plan view of an exemplary necked material.
Figure 2B:
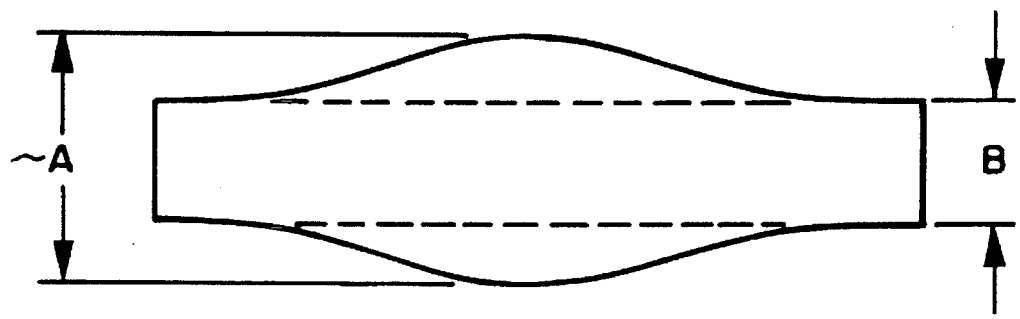
FIG. 2B is a plan view of an exemplary composite elastic necked-bonded material while partially stretched.

For example, with reference to FIGS. 2, 2A, and 2B, if it is desired to prepare a composite elastic necked-bonded material stretchable to a 150% elongation, a width of neckable material shown schematically and not necessarily to scale in FIG. 2 having a width "A" such as, for example, 250 cm, is tensioned so that it necks down to a width "B" of about 100 cm. The necked material shown in FIG. 2A is then joined to an elastic sheet (not shown) having a width of approximately 100 cm and which is at least stretchable to a width of 250 cm. The resulting composite elastic necked-bonded material shown schematically and not necessarily to scale in FIG. 2B has a width "B" of about 100 cm and is stretchable to at least the original 250 cm width "A" of the neckable material for an elongation of about 150%. As can be seen from the example, the elastic limit of the elastic sheet needs only to be as great as the minimum desired elastic limit of the composite elastic necked-bonded material.

Figure 3:
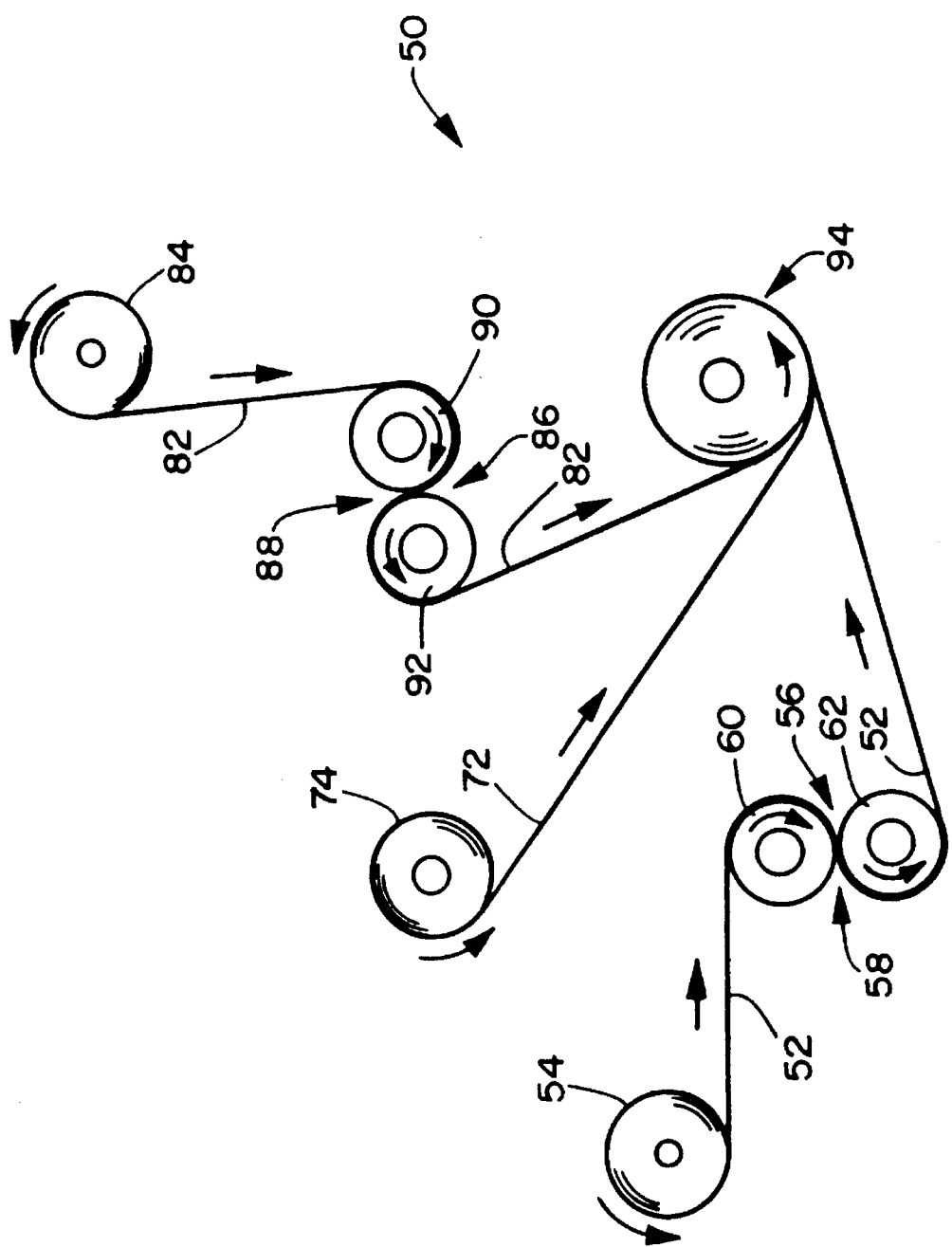
FIG. 3 is a schematic representation of an exemplary process for forming a composite elastic necked-bonded material using a tensioned wind-up method.

Referring now to FIG. 3 of the drawings, there is schematically illustrated at 50 an exemplary process for forming a composite elastic necked-bonded material by a tensioned wind-up method. A first neckable material 52 is unwound from a supply roll 54 and a second neckable material 82 is unwound from a supply roll 84. The neckable materials 52 and 82 then travel in the direction indicated by the arrows associated therewith as the supply rolls 54 and 84 rotate in the direction of the arrows associated therewith. The neckable material 52 then passes through the nip 56 of an S-roll arrangement 58 formed by the stack rollers 60 and 62. Likewise, the neckable material 82 passes through the nip 86 of an S-roll arrangement 88 formed by the stack rollers 90 and 92. The neckable materials 52 and 82 may be formed by known nonwoven extrusion processes such as, for example, known spunbonding or known meltblowing processes and passed through the nips 56 and 86 without first being stored on supply rolls.

An elastic sheet 72 is unwound from a supply roll 74 and travels in the direction indicated by the arrow associated therewith as supply roll 74 rotates in the direction of the arrows associated therewith. The elastic sheet 72 may be formed by known extrusion processes such as, for example, known meltblowing processes or known film extrusion processes without first being stored on a supply roll.

The neckable material 52 then passes through a nip 56 of an S-roll arrangement 58 in a reverse-S wrap path as indicated by the rotation direction of the arrows associated with the stack rollers 60 and 62. Likewise, the neckable material 82 passes through a nip 86 of an S-roll arrangement 88 in a reverse-S wrap path as indicated by the rotation direction arrows associated with the stack rollers 90 and 92. Because the peripheral linear speeds of the rollers of the S-roll arrangements 58 and 88 are controlled to be lower than the peripheral linear speed of the rollers of the wind-up roll 94, the neckable materials 52 and 82 are necked and tensioned so that they sandwich the elastic sheet 72 as they are wound up on the wind-up roll 94.

A two layer composite in which one side of the elastic sheet is protected to prevent bonding (e.g., covered with a plastic film) may be formed by the above-described method. Multilayer materials having multiple layers of elastic sheet and multiple layers of necked material such as, for example, palindromic laminates, may also be formed by the same method. The roll of material on the wind-up roll 94 may be heated to soften the elastic sheet so that the layers join to form a composite elastic necked-bonded material.

Alternatively, a necked material and a pressure sensitive elastomer adhesive sheet such as, for example, a pressure sensitive elastomer adhesive web of meltblown fibers may be joined by the above-described tensioned wind-up method. In that case, tension from the necked material provides pressure to activate the pressure sensitive elastomer adhesive sheet so that the layers join forming a composite elastic necked-bonded material.

The above-described tensioned wind-up bonding methods are suited for low basis weight elastomeric sheets. For example, elastic sheets may be used having basis weights less than 0.5 osy (ounces per square yard), for example, from about 0.25 to about 0.4 osy. Such extremely low basis weight sheets are useful for economic reasons, particularly in disposable products. Additionally, elastic sheets having higher basis weights such as, for example, from about 0.5 to about 10 osy may also be used.

With regard to the bonding pressure utilized when bonding is effected by the above-described tensioned wind-up method, specification of a bonding pressure does not, in itself, take into account complicating factors such as, for example, the bonding compatibility of elastic sheet and the necked materials and/or the basis weight weights of the materials. Nonetheless, one skilled in the art, taking into account such factors will readily be able to appropriately select and vary an effective bonding pressure.

Conventional drive means and other conventional devices which may be utilized in conjunction with the apparatus of FIG. 3 are well known and, for purposes of clarity, have not been illustrated in the schematic view of FIG. 3.

Figure 4:
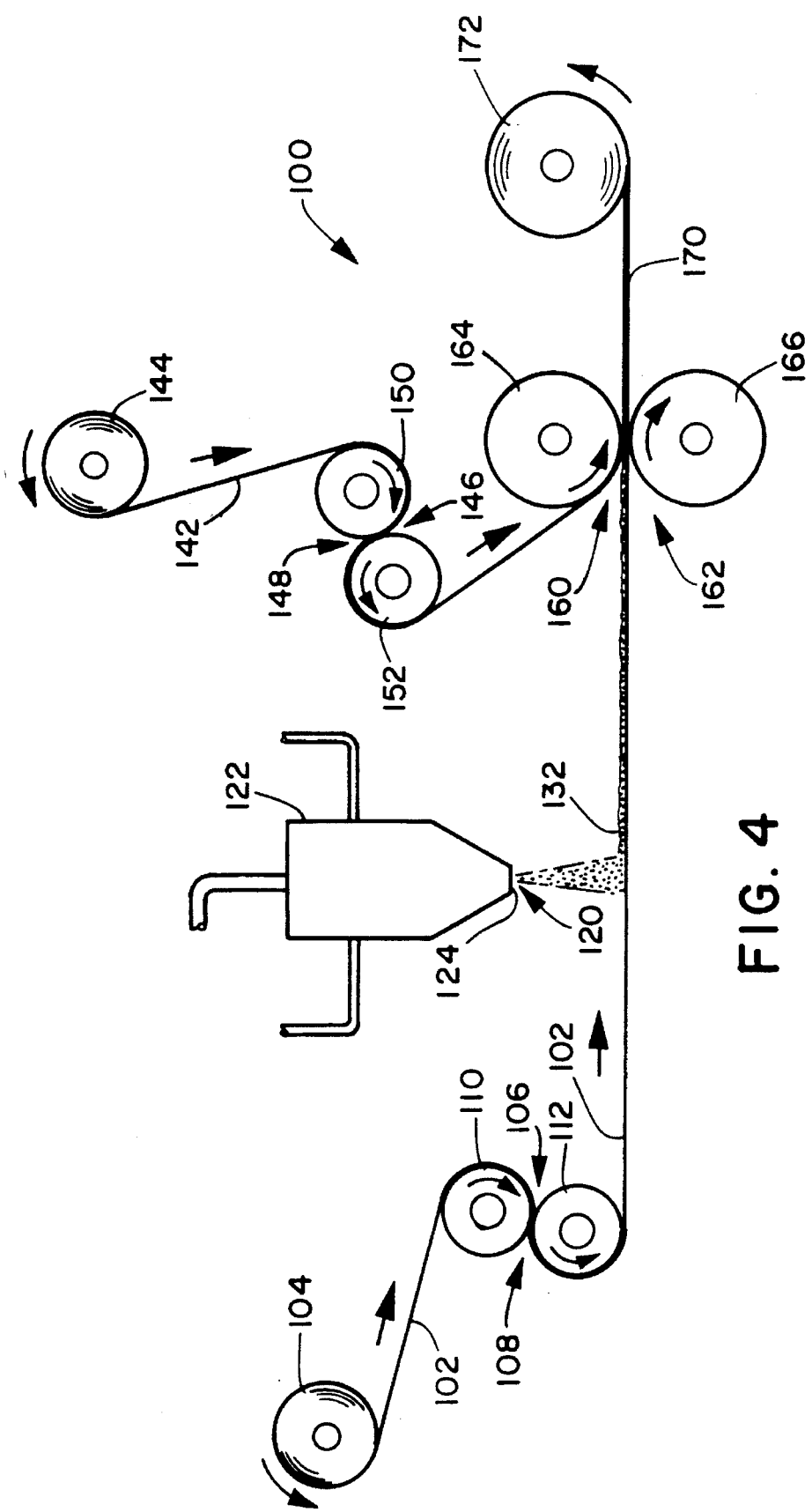
FIG. 4 is a schematic representation of an exemplary process for forming a composite elastic necked-bonded material by meltblowing an elastic web between two necked material layers.

Referring now to FIG. 4 of the drawings, there is schematically illustrated at 100 an exemplary process for forming a composite elastic material by meltblowing a web of elastic fibers onto a first necked material, overlaying a second necked material and then joining the layers with a bonder roller arrangement.

A first neckable material 102 is unwound from a supply roll 104. The neckable material 102 then travels in the direction indicated by the arrow associated therewith as the supply roll 104 rotates in the direction of the arrow associated therewith. The neckable material 102 then passes through a nip 106 of an S-roll arrangement 108 formed by the stack rollers 110 and 112. The neckable material 102 may be formed by nonwoven extrusion processes, such as, for example, spunbonding or meltblowing processes, and then passed directly through the nip 106 of the S-roll arrangement 108 without first being stored on a supply roll.

The neckable material 102 then passes through the nip 106 of the S-roll arrangement 108 in a reverse S-wrap path as indicated by the rotation direction arrows associated with the stack rollers 110 and 112. Because the peripheral linear speed of the rollers of the S-roll arrangement 108 is controlled to be lower than the peripheral linear speed of the rollers of the bonder roller arrangement 162, the neckable material 102 is tensioned so that it necks a desired amount and is maintained in such tensioned, necked condition as the elastic sheet 132 is formed directly on the nonelastic material.

As the necked material 102 passes under the meltblowing process equipment 122, an elastic sheet 132 of meltblown fibers 120 is formed directly on the necked material 102. The meltblown fibers 120 may include meltblown microfibers.

Generally, any suitable elastomeric fiber forming resins or blends containing the same may be utilized for the nonwoven webs of elastomeric fibers of the invention and any suitable elastomeric film forming resins or blends containing the same may be utilized for the elastomeric films of the invention.

The elastic sheet 132 of meltblown fibers 120 may be formed from elastomeric polymers such as, for example, block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. One such block copolymer may be, for example, KRATON G-1657.

Other exemplary elastomeric materials which may be used to form the elastic sheet 132 include elastomeric polyester materials, elastomeric polyurethane materials and elastomeric polyamide materials. The elastic sheet 132 may also be a pressure sensitive elastomer adhesive sheet. For example, the elastic sheet 132 may be formed from a blend of about 63% by weight KRATON G-1657, 20% polyethylene NA-601, and 17% REGALREZ 1126 having a melt flow of from about 12 grams per ten minutes to about 18 grams per ten minutes when measured at 190° C. and under a 2160 gram load; an elongation of about 750%; a modulus of elongation at 100% of from about 155 to about 200 psi; and a modulus of elongation at 300% of from about 200 to about 250 psi. More particularly, the KRATON G block copolymer may have a melt flow of about 15 grams per ten minutes when measured at 190° C. and under a 2160 gram load; an elongation of about 750%; a modulus of elongation at 100% of about 175 psi; and a modulus of elongation at 300% of about 225 psi. Such materials are described, for example, in previously referenced J. S. Keiffer and T. J. Wisneski U.S. Pat. No. 4,789,699, filed Oct. 15, 1986 for "Ambient Temperature Bondable Elastomeric Nonwoven Web."

Additionally, the elastic sheet 132 may be a composite material in that it may be made of two or more individual coherent webs or it may be made of one or more webs individually containing a mixture of elastic and nonelastic fibers. An example of the latter type of elastic web is described in previously referenced U.S. Pat. No. 4,209,563. Another example of such a composite web would be one made by a technique such as disclosed in previously referenced U.S. Pat. No. 4,100,324.

A stream of elastomeric meltblown fibers 120 is directed from the meltblowing process equipment 122 on to the necked material 102 at a high velocity while the fibers are in a softened state so that bonding and/or entangling occurs between the deposited elastomeric sheet 132 of meltblown fibers 120 and the necked material 102.

Generally, the meltblown fibers 120 bond adequately to the necked material when the fibers have an initial high velocity, for example, from about 300 feet per second to about 1000 feet per second. Additionally, the vertical distance from forming nozzle 124 of the meltblowing process equipment 122 to the necked material 102 may range from about 4 to about 18 inches. For example, the vertical distance may be set at about 12 inches. The elastic sheet 132 may also be formed by other known extrusion processes such as, for example, known film extrusion processes.

A second neckable material 142 is unwound from a supply roll 144. The neckable material 142 then travels in the direction indicated by the arrow associated therewith as the supply roll 144 rotates in the direction of the arrow associated therewith. The neckable material 142 then passes through a nip 146 of an S-roll arrangement 148 formed by the stack rollers 150 and 152. Alternatively, the neckable material 142 may be formed by known nonwoven extrusion processes, such as, for example, known spunbonding or known meltblowing processes, and then passed directly through the nip 146 of the S-roll arrangement 148 without first being stored on a supply roll. The neckable material 142 passes through the nip 146 of the S-roll arrangement 148 in a reverse S-wrap path as indicated by the rotation direction arrows associated with the stack rollers 150 and 152. Because the peripheral linear speed of the rollers of the S-roll arrangement 148 is controlled to be less than the peripheral linear speed of the rollers of the bonder roller arrangement 162, the neckable material 142 is tensioned so that it necks a desired amount and is maintained in such tensioned, necked condition as it is overlaid on the elastic sheet 132 and the necked material 102. The three layers are passed through the nip 160 of a bonder roller arrangement 162 to produce a composite elastic necked bonded material 170 which is wound on a wind-up roll 172.

The bonder roller arrangement 162 may be a patterned calender roller 164 arranged with a smooth anvil roller 166. Alternatively, a smooth calender roller may be used. One or both of the calender roller 164 and the anvil roller 166 may be heated and the pressure between these two rollers may be adjusted by well-known means to provide the desired temperature and bonding pressure. Other methods may be used to join the layers such as, for example, adhesives, ultrasonic welding, laser beams, and/or high energy electron beams. The bond surface area on the composite elastic necked bonded laminate 170 may approach about 100 percent and still provide a material with good stretch properties. Alternatively, a bond pattern may be used such as, for example, the sinusoidal dot pattern shown in FIG. 5.

The elastic sheet 132 may also be a pressure sensitive elastomer adhesive sheet such as, for example, a pressure sensitive elastomer adhesive web of meltblown fibers. In such case, joining the necked material layers 102 and 142 to the pressure sensitive elastomer adhesive sheet 132 may be accomplished by pressure bonding techniques such as, for example, pressure bonder rollers or tensioned wind-up methods.

Conventional drive means and other conventional devices which may be utilized in conjunction with the apparatus of FIG. 4 are well known and, for purposes of clarity, have not been illustrated in the schematic view of FIG. 4.

Figure 6:
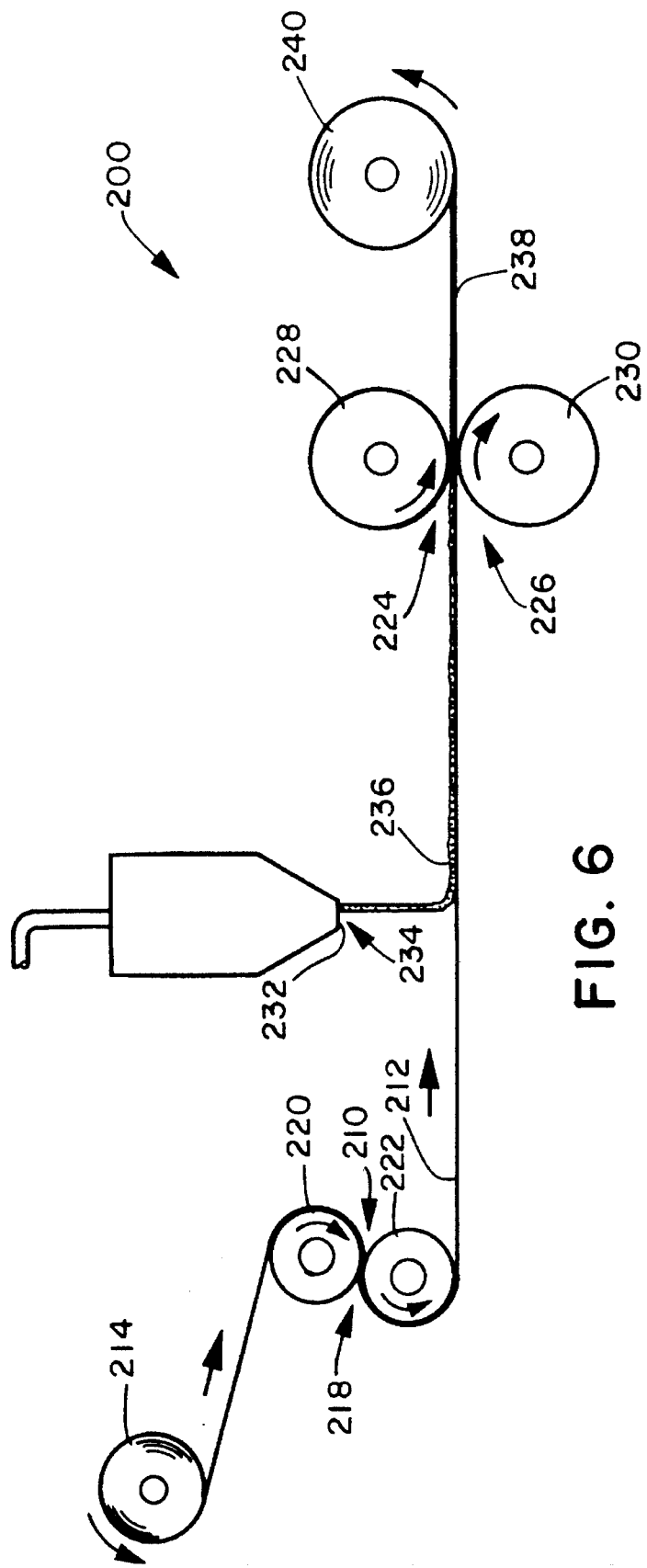
FIG. 6 is an illustration of an exemplary process for forming a composite elastic necked-bonded material using a film extrusion method.

Referring now to FIG. 6 of the drawings there is illustrated at 200 a method for forming a composite elastic necked-bonded material utilizing a film-extrusion process.

According to the invention, a continuously-advancing tensioned, necked material 212 is provided so that it passes under a film extrusion apparatus. The tensioned, necked material 212 may be pre-necked and maintained in its necked configuration (e.g., by tension or by a treatment such as heat while the material is necked) for provision into the process. For example, the tensioned, necked material may be a reversibly necked material. Alternatively, the tensioned, necked material 212 may be a neckable material that is unwound from a supply roll 214 as it travels in the direction indicated by the arrow associated therewith as the supply roll 214 rotates in the direction of the arrows associated therewith. The neckable material may be formed by known nonwoven extrusion processes, such as, for example, known meltblowing processes or known spunbonding processes, and passed directly through the nip 216 without first being stored on a supply roll.

The neckable material passes through the nip 216 of the S-roll arrangement 218 in a reverse-S path as indicated by the rotation direction arrows associated with the stack rollers 220 and 222. From the S-roll arrangement 218, the neckable material passes through the nip 224 formed by a pressure roller arrangement 226. The pressure roll arrangement 226 contains a first pressure roll 228 and a second pressure roll 230.

Because the peripheral linear speed of the rollers of the S-roll arrangement 218 is controlled to be less than the peripheral linear speed of the rollers of the pressure roller arrangement 226, the neckable material is tensioned between the S-roll arrangement 218 and the pressure nip of the bonder roll arrangement 226. By adjusting the difference in the speeds of the rollers, the neckable material is tensioned so that it necks a desired amount and is maintained in such tensioned, necked condition as a tensioned, necked material 212.

A substantially molten elastomer is extruded through a die tip 232 to form an extruded elastomeric film 234. This extruded elastomeric film 234 is deposited onto the tensioned, necked material 212 within from about 0.1 to about 1 second of exiting the die tip 232 to form a multilayer material 236. The extruded elastomeric film 234 may be deposited onto the tensioned, necked material within from about 0.25 to about 0.5 seconds of exiting the die tip. Desirably, the extruded elastomeric film 234 is deposited onto the tensioned, necked material within from about 0.3 to about 0.45 seconds of exiting the die tip.

According to the invention, the extruded elastomeric film 234 may be formed from any suitable elastomeric film forming resins or blends containing the same. In one aspect of the invention, the extruded elastomeric film 234 may be a pressure sensitive elastomer adhesive film. Such a pressure sensitive elastomer adhesive film may be formed from a blend of an elastomeric polymer and a tackifying resin and/or other additives. For example, the pressure sensitive elastomer adhesive may be composed of one or more block copolymers having the general formula A-B-A' where A and A' are each a thermoplastic polymer endblock which contains a styrenic moiety such as a poly (vinyl arene) and where B is an elastomeric polymer midblock such as a hydrogenated conjugated diene or a lower alkene polymer (e.g., (polystyrene/poly(ethylenebutylene)/polystyrene) block copolymers available from the Shell Chemical Company under the trademark KRATON G such as, for example, KRATON G-1657). Such block copolymers may be blended with tackifying resins such as, for example, REGALREZ hydrocarbon resins available from Hercules Incorporated. For example, a particularly useful composition included, by weight, about 61 to about 65 percent KRATON G-1657, about 17 to about 23 percent Polyethylene NA-601, and about 15 to about 20 percent REGALREZ 1126.

Generally speaking, the film of elastomer may be extruded at a temperature suitable for conventional film extrusion processes for the particular elastomeric material. For example, a composition containing, by weight, about 61 to about 65 percent KRATON® G-1657, about 17 to about 23 percent Polyethylene NA-601, and about 15 to about 20 percent REGALREZ 1126 may be extruded into an elastomeric film (e.g., pressure sensitive elastomer adhesive film) at a temperature of from about 360° to about 540° F. As a further example, an elastomeric film (e.g., pressure sensitive elastomer adhesive film) may be extruded at a temperature of from about 390° to about 420° F. Desirably, an elastomeric film (i.e., pressure sensitive elastomer adhesive film) may be extruded at a temperature of about 400° F.

Immediately after the extruded elastomeric film 234 is deposited onto the tensioned, necked material 212 to form a multilayer material 236, pressure is applied to bond the tensioned, necked material 212 to the extruded elastomeric film 234 thereby forming a composite elastic necked-bonded material 238 which is wound up on a wind-up roll 240. In one embodiment of the invention, the multilayer material 236 is introduced into the nip 224 of a pressure roll arrangement 226. Generally speaking, a nip is an area located between two rolls in close proximity. A gap or a controlled gap refers to a nip with a measurable space between the rollers. For purposes of the present invention, a pressurized gap refers to a nip set up such that the rolls are essentially in contact in the absence of material (passing between the rolls).

The pressure roll arrangement 226 may include at least a first pressure roll 228 and a second pressure roll 230 which can be set to define a controlled gap between the rolls. Alternatively, the pressure rolls may be set to define a pressurized nip such that the rolls are essentially in contact when no multilayer material 236 is between the rolls (i.e., in the absence of material). Desirably, one or both of the pressure rolls may be chilled. For example, one or both of the pressure rolls may be chilled to temperatures of 55° to 50° F. or less. Chilling the pressure rolls is believed to help cool the extruded polymer film so it more rapidly "sets" in bonding contact with the tensioned, necked material.

Generally speaking, the gap setting between the first and second rolls of the pressure roll arrangement is large enough so that the force required to extend the resulting composite elastic material on the first pull is at least about 25 percent less than the force required to extend an identical composite elastic material prepared in an identical pressure roll arrangement with a pressurized nip such that the rolls are essentially in contact in the absence of material. For example, the method of the present invention may be practiced with the gap setting between the pressure rollers at about 15 mils to about 125 mils. As a further example, the method of the present invention may be practiced with the gap setting between the pressure rollers at about 30 mils to about 100 mils. Desirably, the method of the present invention is practiced with the gap setting between the pressure rollers at about 40 mils to about 65 mils.

Figure 7:
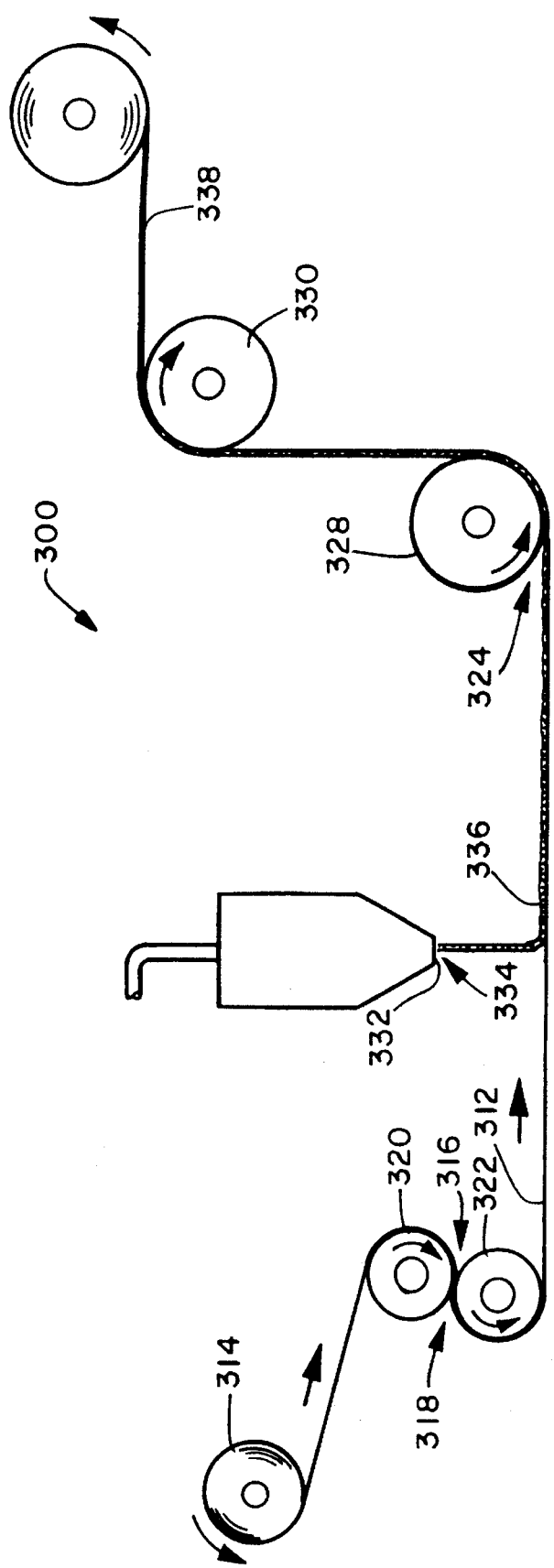
FIG. 7 is an illustration of an exemplary process for forming a composite elastic necked-bonded material using a film extrusion method.

Referring now to FIG. 7 of the drawings there is illustrated at 300 a process for forming a composite elastic necked-bonded material utilizing a film-extrusion step.

According to the invention, a continuously advancing tensioned, necked material 312 is provided so that is passes under an film extrusion apparatus. The tensioned, necked material 312 may be pre-necked and maintained in its necked configuration (e.g., by tension or by a treatment such as heat) for provision into the process. Alternatively, the tensioned, necked material 312 may be a neckable material that is unwound from a supply roll 314 and travels in the direction indicated by the arrow associated therewith as the supply roll 314 rotates in the direction of the arrows associated therewith. The neckable material may be formed by known nonwoven extrusion processes, such as, for example, known meltblowing processes or known spunbonding processes, and passed directly through the nip 316 without first being stored on a supply roll.

The neckable material passes through the nip 316 of the S-roll arrangement 318 in a reverse-S path as indicated by the rotation direction arrows associated with the stack rollers 320 and 322. From the S-roll arrangement 318, the neckable material passes across the first roll surface 324 of a drive roll arrangement 326. The drive roll arrangement 326 contains a first drive roll 328 and an idler roll 330.

Because the peripheral linear speed of the rollers of the S-roll arrangement 318 is controlled to be less than the peripheral linear speed of the rollers of the drive roll arrangement 326, the neckable material is tensioned between the S-roll arrangement 318 and the first surface 324 of the drive roll arrangement 326. By adjusting the difference in the speeds of the rollers, the neckable material is tensioned so that it necks a desired amount and is maintained in such tensioned, necked condition.

A substantially molten elastomer is extruded through a die tip 332 to form an extruded elastomeric film 334. This extruded elastomeric film 334 is deposited onto the tensioned, necked material 312 within from about 0.1 to about 1 second of exiting the die tip 332 to form a multilayer material 336. The extruded elastomeric film 334 may be deposited onto the tensioned, necked material within from about 0.25 to about 0.5 seconds of exiting the die tip. Desirably, the extruded elastomeric film 334 is deposited onto the tensioned, necked material within from about 0.3 to about 0.45 seconds of exiting the die tip.

According to the invention, the extruded elastomeric film 334 may be formed from any suitable elastomeric film forming resins or blends containing the same. In this embodiment of the invention, it is desirable that the extruded elastomeric film 334 be a pressure sensitive elastomer adhesive film. Such a pressure sensitive elastomer adhesive film may be formed from a blend of an elastomeric polymer and a tackifying resin and/or other additives. For example, the pressure sensitive elastomer adhesive may be composed of one or more elastomeric block copolymers. Useful elastomeric block copolymer include (polystyrene/poly(ethylene-butylene)/polystyrene) block copolymers available from the Shell Chemical Company under the trademark KRATON G such as, for example, KRATON G-1657. Such block copolymers may be blended with tackifying resins such as, for example, REGALREZ hydrocarbon resins available from Hercules Incorporated. For example, a particularly useful composition included, by weight, about 61 to about 65 percent KRATON G-1657, about 17 to about 23 percent Polyethylene NA-601, and about 15 to about 20 percent REGALREZ 1126.

Generally speaking, the film of elastomer may be extruded at a temperature suitable for conventional film extrusion processes for the particular elastomeric material. For example, a composition containing, by weight, about 61 to about 65 percent KRATON® G-1657, about 17 to about 23 percent Polyethylene NA-601, and about 15 to about 20 percent REGALREZ 1126 may be extruded into an elastomeric film (e.g., pressure sensitive elastomer adhesive film) at a temperature of from about 360° to about 540° F. As a further example, an elastomeric film (e.g., pressure sensitive elastomer adhesive film) may be extruded at a temperature of from about 390° to about 420° F. Desirably, an elastomeric film (i.e., pressure sensitive elastomer adhesive film) may be extruded at a temperature of about 400° F.

Immediately thereafter, the multilayer material 336 is introduced onto the first surface 324 of the drive roll arrangement 326. The tension of the tensioned, necked material 312 produced by the difference in the speeds of the rollers generates pressure as the elastomeric film 334 is temporarily configured between the layer of tensioned, necked material 312 and the first surface of 324 of the drive roll arrangement 326. This pressure bonds the tensioned, necked material 312 to the elastomeric film 334 thereby forming a composite elastic necked-bonded material 338 which is wound up on a wind-up roll 340. Since the level of tension needed to generate pressure to bond the components together is generally higher than the tension required to move the material through the process, additional drive roll arrangements may be used. Desirably, the drive roll is chilled. For example, the drive roll may be chilled to temperatures of 55° to 50° F. or less.

Figure 8:
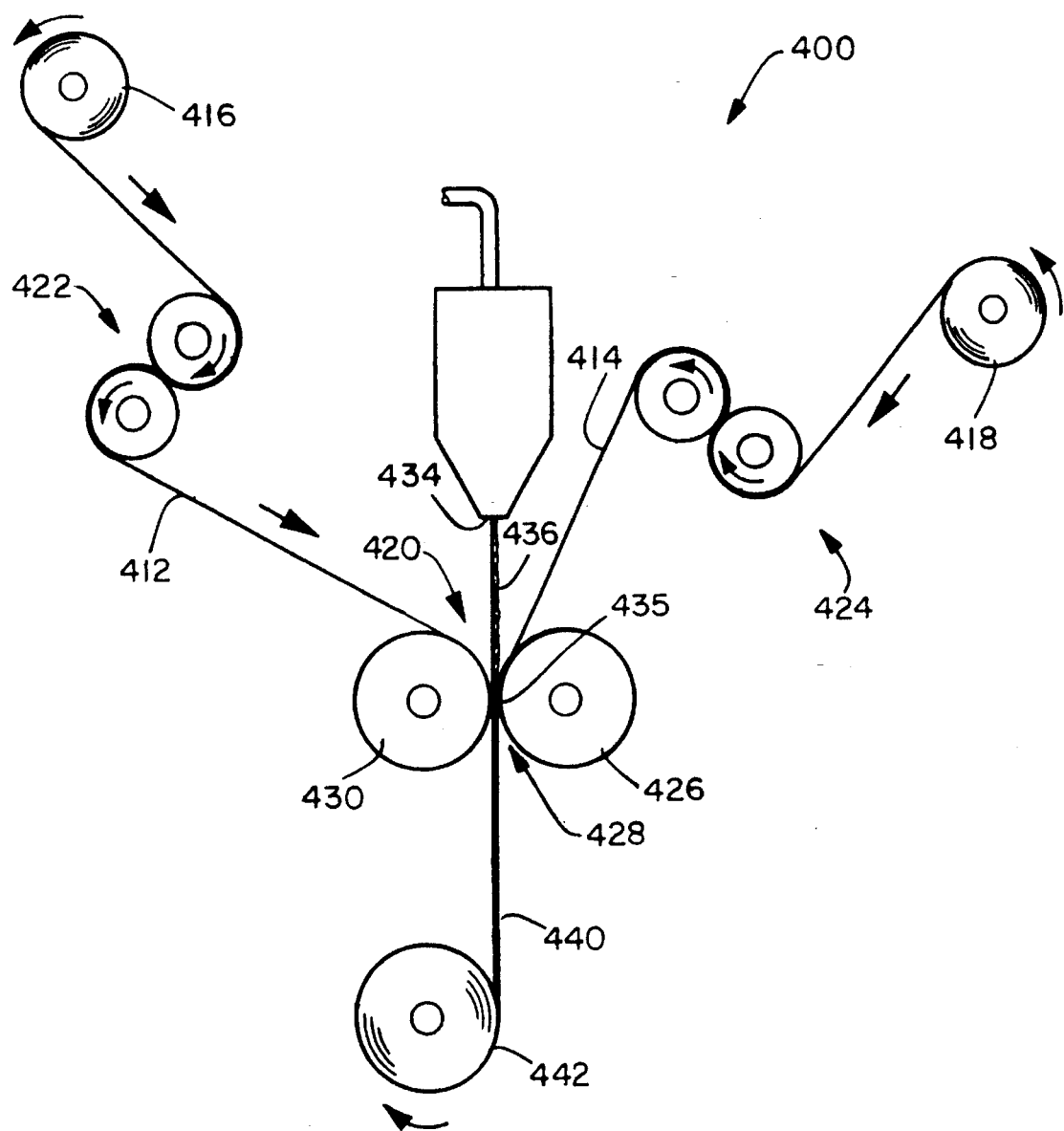
FIG. 8 is an illustration of an exemplary process for forming a composite elastic necked-bonded material using a film extrusion method.

Referring now to FIG. 8 of the drawings there is schematically illustrated at 400 a process for forming a composite elastic necked-bonded material utilizing a film-extrusion step.

According to the invention, a first and second continuously advancing sheet of tensioned, necked material 412 and 414 respectively are provided to pass under a film extrusion apparatus. Each sheet is composed of at least one tensioned, necked material (i.e., multiple layers of tensioned, necked materials may be used). The tensioned, necked material 412 and 414 may be pre-necked and maintained in its necked configuration (e.g., by tension or by a treatment such as heat) for provision into the process. Alternatively, each tensioned, necked material 412 and 414 may be neckable materials that are unwound from supply rolls 416 and 418 respectively. The neckable materials may be formed by known nonwoven extrusion processes, such as, for example, known meltblowing processes or known spunbonding processes, and passed directly to the contact zone 420 without first being stored on a supply roll.

Each neckable material passes through the nip of an S-roll arrangement, 422 and 424 respectively in a reverse-S path as indicated by the rotation direction arrows associated with the stack rollers. From the S-roll arrangements 422 and 424, the neckable materials pass through the pressure nip 426 formed by a pressure roller arrangement 428. The pressure roll arrangement contains a first pressure roll 430 and a second pressure roll 432.

Because the peripheral linear speeds of the rollers of the S-roll arrangements 422 and 424 are controlled to be less than the peripheral linear speed of the rollers of the pressure roller arrangement 428, the neckable materials are tensioned between the S-roll arrangements and the pressure nip of the pressure roll arrangements. By adjusting the difference in the speeds of the rollers, the neckable materials are tensioned so that they neck a desired amount and are maintained in such tensioned, necked condition as tensioned, necked materials 412 and 414.

The tensioned, necked materials 412 and 414 are configured to advance in an intersecting relationship to form a contact zone 420 located beneath a film extrusion apparatus.

A substantially molten elastomer is extruded through a die tip 434 to form an extruded elastomeric film 436. This extruded elastomeric film 436 is deposited into the contact zone 420 so that the tensioned, necked materials 412 and 414 immediately sandwich the film. The extruded elastomeric film 436 is deposited into the contact zone and between the tensioned, necked materials within from about 0.1 to about 1 second of exiting the die tip 434 to form a multilayer material 438. The extruded elastomeric film 436 may be deposited onto the tensioned, necked materials within from about 0.25 to about 0.5 seconds of exiting the die tip. Desirably, the extruded elastomeric film 436 is deposited onto the tensioned, necked materials within from about 0.3 to about 0.45 seconds of exiting the die tip.

According to the invention, the extruded elastomeric film 436 may be formed from any suitable elastomeric film forming resins or blends containing the same. In one aspect of the invention, the extruded elastomeric film 436 may be a pressure sensitive elastomer adhesive film. Such a pressure sensitive elastomer adhesive film may be formed from a blend of an elastomeric polymer and a tackifying resin and/or other additives. For example, a particularly useful composition included, by weight, about 61 to about 65 percent KRATON G-1657, about 17 to about 23 percent Polyethylene NA-601, and about 15 to about 20 percent REGALREZ 1126.

Generally speaking, the film of elastomer may be extruded at a temperature suitable for conventional film extrusion processes for the particular elastomeric material. For example, a composition containing, by weight, about 61 to about 65 percent KRATON® G-1657, about 17 to about 23 percent Polyethylene NA-601, and about 15 to about 20 percent REGALREZ 1126 may be extruded into an elastomeric film (e.g., pressure sensitive elastomer adhesive film) at a temperature of from about 360° to about 540° F. As a further example, an elastomeric film (e.g., pressure sensitive elastomer adhesive film) may be extruded at a temperature of from about 390° to about 480° F. Desirably, an elastomeric film (i.e., pressure sensitive elastomer adhesive film) may be extruded at temperatures from about 400° to about 420° F.

Immediately after the extruded elastomeric film 436 is deposited into the contact zone 420 and between the tensioned, necked materials to form a multilayer material 438, pressure is applied to bond the tensioned, necked materials 412 and 414 to the extruded elastomeric film 436 thereby forming a composite elastic necked-bonded material 440 which is wound up on a wind-up roll 442. In one embodiment of the invention, the multilayer material 436 is introduced into the nip 426 of a pressure roll arrangement 428. The pressure roll arrangement 428 may include at least a first pressure roll 430 and a second pressure roll 432 which can be set to define a controlled gap between the rolls.

Alternatively, the pressure rolls may be set to define a pressurized nip such that the rolls are essentially in contact when no multilayer material 438 is between the rolls (i.e., in the absence of material). Desirably, one or both of the pressure rolls may be chilled. For example, one or both of the pressure rolls may be chilled to temperatures of 55° to 50° F. or less. Chilling the pressure rolls is believed to help cool the extruded polymer film so it more rapidly "sets" in bonding contact with the tensioned, necked material.

Generally speaking, the gap setting between the first and second rolls of the pressure roll arrangement is fixed so that the force required to extend the composite elastic material on the first pull is at least about 25 percent less than the force required to extend an identical composite elastic material prepared in an identical pressure roll arrangement with a pressurized nip such that the rolls are essentially in contact in the absence of material. For example, the method of the present invention may be practiced with the gap setting between the pressure rollers at about 15 mils to about 125 mils. As a further example, the method of the present invention may be practiced with the gap setting between the pressure rollers at about 30 mils to about 100 mils. Desirably, the method of the present invention is practiced with the gap setting between the pressure rollers at about 40 mils to about 65 mils.

EXAMPLES 1–7

The composite elastic necked-bonded materials of examples 1–7 were made by joining an elastic sheet to at least one necked material. Tables 1,3,5,7,8,10,12 and 14 provide Grab Tensile Test data for control samples and composite elastic necked-bonded material samples. The Grab Tensile Tests were performed on a constant rate of extension tester, Instron Model 1122 Universal Testing Instrument, using 4 inch by 6 inch samples. The following mechanical properties were determined for each sample: Peak Load, Peak Total Energy Absorbed and Percent Elongation.

The samples were also cycled on the Instron Model 1122 with Microcon II—50 kg load cell and the results reported on Tables 2,4,6,9,11 and 13. The jaw faces of the tester were 1 inch by 3 inches so the samples were cut to 3 inches by 7 inches (7 inches in the direction to be tested) and weighed individually in grams. A 4 inch gauge length was used. Chart and crosshead speeds were set for 20 inches per minute and the unit was zeroed, balanced and calibrated according to the standard procedure. The maximum extension limit for the cycle length was set at a distance determined by calculating 56 percent of the "elongation to break" from the Grab Tensile Test. The samples were cycled to the specified cycle length four times and then were taken to break on the fifth cycle. The test equipment was set to report Peak Load in pounds force, Peak Elongation in percent and Peak Energy Absorbed in inch pounds force per square inch. The area used in the energy measurements (i.e., the surface area of material tested) is the gauge length (four inches) times the sample width (3 inches) which equals twelve square inches. The results of the Grab Tensile tests and cycle tests have been normalized for measured basis weight.

Peak Total Energy Absorbed (TEA) as used herein is defined as the total energy under a stress versus strain (load versus elongation) curve up to the point of "peak" or maximum load. TEA is expressed in units of work/(length)$^2$ or (pounds force * inch)/(inches)$^2$. These values have been normalized by dividing by the basis weight of the sample in ounces per square yard (osy) which produces units of [(lbs$_f$ * inch)/inch$^2$]/osy.

Peak Load as used herein is defined as the maximum load or force encountered in elongating the sample to break. Peak Load is expressed in units of force (lbs$_f$) which have been normalized for the basis weight of the material resulting in a number expressed in units of lbs$_f$/(osy).

Elongation as used herein is defined as relative increase in length of a specimen during the tensile test. Elongation is expressed as a percentage, i.e., [(increase in length)/(original length)]×100.

Permanent Set after a stretching cycle as used herein is defined as a ratio of the increase in length of the sample after a cycle divided by the maximum stretch during cycling. Permanent Set is expressed as a percentage, i.e., [(final sample length–initial sample length)/(maximum stretch during cycling–initial sample length)]×100. Permanent Set is related to recovery by the expression [permanent set= 100– recovery] when recovery is expressed as a percentage. In the Tables, the value reported in the permanent set row at the column titled "To Break" is the value for Peak Elongation unless otherwise noted.

Example 1

Neckable Spunbonded Material

A neckable web of spunbonded polypropylene having a basis weight of about 0.8 ounces per square yard (osy) was tested on an Instron Model 1122 Universal Testing Instrument. The results are reported in Tables 1 and 2 under the heading "Control 1". The machine direction total energy absorbed is given in the column of Table 1 entitled "MD TEA". The machine direction peak load is given in the column entitled "MD Peak Load". The machine direction elongation to break is given in the column entitled "MD Elong". The cross-machine direction total energy absorbed is given in the column entitled "CD TEA". The cross-machine direction peak load is given in the column entitled "CD Peak Load". The cross-machine direction elongation to break is given in the column entitled "CD Elong".

The Peak TEA, Peak Load, and Permanent Set is given for each stretch cycle in Table 2. At the end of the series of cycles, the sample was elongated to break and the results reported under the heading "To Break".

Elastic Sheet

A blend of about 63% by weight KRATON G-1657, 20% polyethylene NA-601 and 17% REGALREZ 1126 having a melt flow of about 15 grams per ten minutes when measured at 190° C. and under a 2160 gram load; an elongation of about 750%; a modulus of elongation at 100% of about 175 psi; and a modulus of elongation at 300% of about 225 psi was formed into an elastic sheet of meltblown fibers utilizing recessed die tip meltblowing process equipment having a 0.090 inch recess and a 0.067 inch air gap. The equipment was operated under the following conditions: die zone temperature about 540° F.; die polymer melt temperature about 535° F.; barrel pressure 580 psig; die pressure 190 psig; polymer throughput 2 pounds per hour; forming drum vacuum about 2 inches of water; horizontal forming distance about 12 inches; vertical forming distance about 12 inches and winder speed about 19 feet per minute. An elastic web of meltblown fibers was formed having a basis weight of about 105 grams per square meter. The sheet was tested on the Instron Model 1122 Universal Testing Instrument and the results are given in Tables 1 and 2 under the heading "Elastomer." Data collected in the last cycle (i.e. "to 176%") for the elastic sheet control material was read at the break elongation for the composite elastic necked-bonded material shown as 176% at Table 2 in the "To Break" column and the "perm set" row for "Composite 1".

Composite Elastic Neck-Bonded Material

The neckable spunbond polypropylene material having a basis weight of 0.8 osy and an initial width of about 17.75 inches was unwound on a "22 inch Face Coating Line rewinder" made by the Black-Clawson Company. The wind-up speed was set at about 4 to about 5 feet per minute and the unwind resistance force was set at 48 pounds per square inch causing the material to neck or constrict to a width of about 8.5 to about 8.75 inches as it was wound on a roll.

At the wind-up roll, the elastic sheet of meltblown fibers described above having a basis weight of about 105 grams per square meter, was overlaid on the tensioned, necked material so that the two webs wound together on the wind up roll. The elastic sheet had a thin plastic film on one surface so it would stick to only one adjacent tensioned, necked layer of material.

Figure 5:
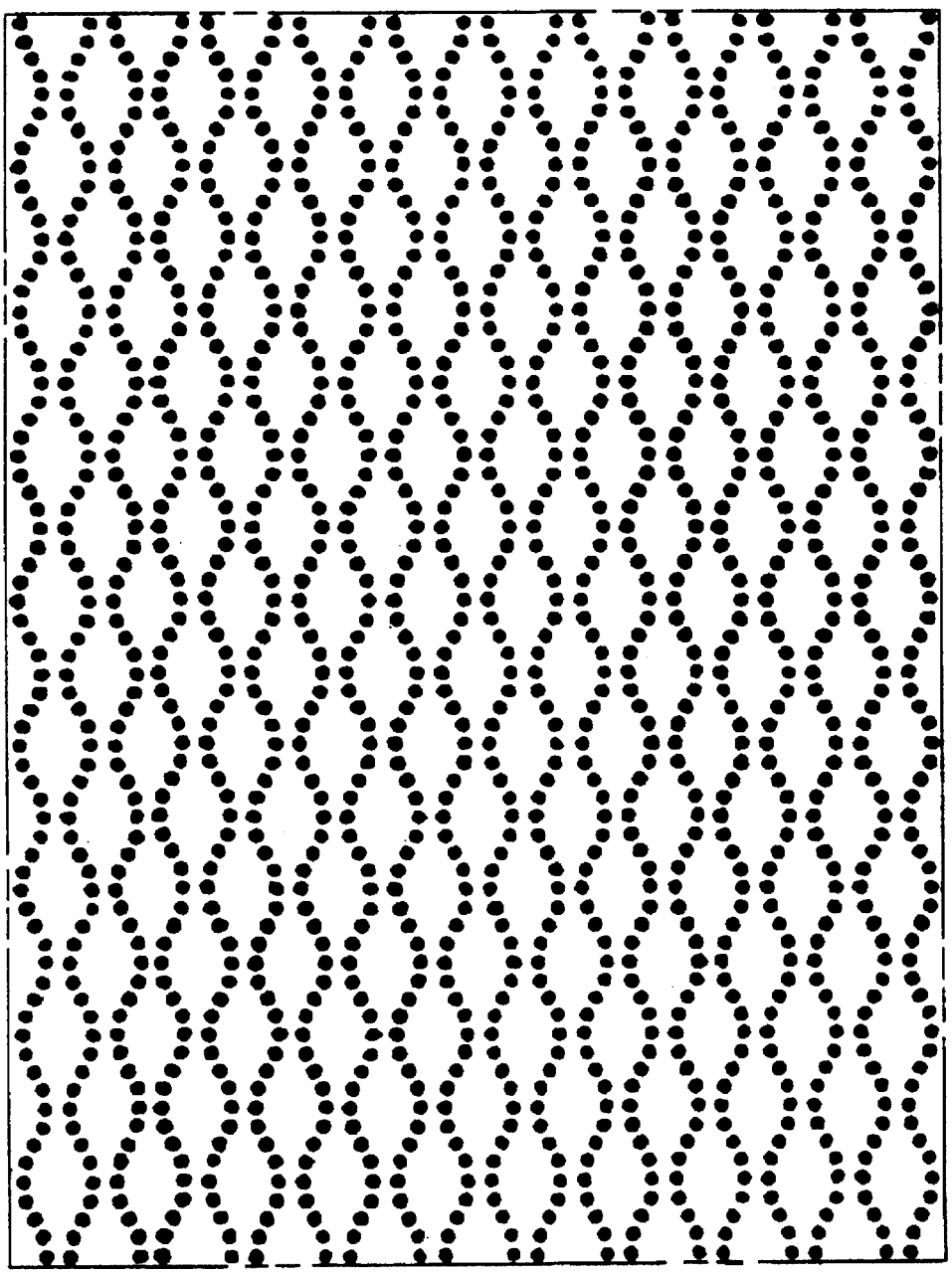
FIG. 5 is a representation of an exemplary bonding pattern used to join components of a composite elastic necked-bonded material.

The tightly wound roll was unwound and bonded using an engraved calender roller having the pattern shown in FIG. 5. The bond pattern of the engraved roller had approximately 75 pins or bond points per square inch. Each pin had a diameter of about 0.059 inch to produce bond area of about 20.5 percent. The bond rollers were maintained at room temperature (about 75° F.), bond pressure was set at about 20 pounds per square inch, and the line was operated at a speed of from about 7 to about 10 feet per minute.

The composite elastic neck-bonded material was tested on the Instron Model 1122 Universal Testing Instrument and the results are given in Tables 1 and 2 under the heading "Composite 1".

Comparative Example 1

Reversibly Necked Spunbonded Material

The neckable spunbonded polypropylene material described above having a basis weight of 0.8 osy and an initial width of about 17.75 inches was unwound on a "22 inch Face Coating Line rewinder" made by the Black-Clawson Company. The wind-up speed was set at about 4 to about 5 feet per minute and the unwind resistance force was set at 48 pounds per square inch causing the material to neck or constrict to a width of about 8½ to 8¾ inches as it was rewound on a roll. The roll of necked material was heated in a Fischer Econotemp™ Lab Oven Model 30F at 120° C. for 1 hour which was thought to be more than the amount of time required to heat the entire roll, i.e., the center of the roll, to the oven temperature for about 300 seconds. This heat treatment formed a reversibly necked material from the neckable material. The reversibly necked material was tested on the Instron Model 1122 Universal Testing Instrument and the results are reported in Tables 1 and 2 under the heading "Heat Set." Necking and heat treating the neckable spunbonded material decreased most tensile properties but increased the cross-machine direction stretch.

Properties of the reversibly necked material are shown in Tables 1 and 2 under the heading of "Heat Set". It can been seen by comparing the "Composite 1" with the "Elastomer 1" from the Tables that the necked layer of the composite elastic material appears to act as a positive stop, that is, a peak load of 1.69 for "Composite 1" compared to 0.43 for "Elastomer 1" at the break elongation of "Composite 1" (176%). The elastic layer lowers the normalized grab tensile strength data of the composite elastic necked-bonded material because the elastic layer adds weight but little strength, especially in the machine direction since the necked material has a low elongation to break in that direction. Permanent set is significantly lower in the composite elastic necked-bonded material than in the reversibly necked material.

Example 2

Neckable Spunbonded Material

A neckable spunbonded polypropylene material having a basis weight of about 0.4 osy was tested on an Instron Model 1122 Universal Testing Instrument. The results are reported in Table 3 under the heading "Control 2".

Elastic Sheet

An elastic sheet of meltblown fibers as described in Example 1 and having a basis weight of about 70 grams per square meter was tested on an Instron Model 1122 Universal Testing Instrument. This elastic sheet had a plastic film on one surface to prevent the rolled-up material from sticking together. The results are reported in Tables 3 and 4 under the heading "Elastomer 2".

Composite Elastic Necked-Bonded Laminate

The neckable spunbonded polypropylene material and the elastic sheet of meltblown fibers were joined on a heated bonder roller arrangement. The bonder speed was set at 21 feet per minute, nip pressure was 355 pounds per linear inch, and the calender roller and anvil roller temperatures were set at 127° F. The elastic sheet was unwound from a supply roll at a rate of 21 feet per minute so there would be no tensioning of the elastic sheet. The neckable spunbonded polypropylene material was unwound from a supply roll at a rate of about 17 feet per minute or about 20 percent slower than the bonder. The difference in speed created a tension which caused the neckable material to neck before it was joined to the elastic sheet.

The composite elastic necked-bonded material produced in this manner was tested on the Instron Model 1122 Universal Testing Instrument and the results are given in Tables 3 and 4 under the heading "Composite 2". Compared to the Control material, the composite elastic necked-bonded material has lower tensile properties with equivalent machine direction stretch and significantly greater cross-machine direction stretch. Compared to the elastic sheet, the laminate has lower values for Peak Total Energy Absorbed (PTEA) but higher Peak Loads when going to break.

In cross-machine direction cycling (Table 4), the laminate has slightly lower PTEA, slightly greater Peak Load and equivalent values for permanent set. When taken to the break elongation for the laminate, the laminate has higher PTEA and Peak Load values than the elastomeric material.

Example 3

A composite elastic necked-bonded material was prepared by joining a layer of the neckable spunbonded polypropylene material of Example 2 to each side of the elastic meltblown sheet of Example 2.

The neckable spunbonded polypropylene material and the elastic meltblown sheet were joined utilizing a heated bonder roller arrangement. The bonder speed was set at 21 feet per minute, nip pressure was 355 pounds per linear inch, and the calender roller and anvil roller temperatures were set at 127° F. The elastic sheet unwind was set at 21 feet per minute so there would be no tensioning of the elastic web. The neckable spunbonded polypropylene material unwinds were manually braked and were unwound at about 18 feet per minute.

The composite elastic necked-bonded material produced in this manner was tested on the Instron Model 1122 Universal Testing Instrument. Results for the Grab Tensile Test for the Control materials and the composite elastic material are given in Table 5 under the respective headings "Control 3" and "Composite 3A". Compared to the neckable spunbonded control material, all Grab Tensile Test results were lower for the composite elastic material except for the machine direction elongation which remained unchanged and the cross-machine direction elongation which is significantly increased. Compared to the elastic sheet, the composite elastic necked-bonded material has lower values for Peak Total Energy Absorbed and Elongation but greater values for Peak Loads. Table 6 shows the cross-machine direction stretching for the Elastomer 2 and Composite 3A demonstrating considerably greater Peak TEA and Peak Load during the final cycle.

Comparative Example 3

A composite elastic material was prepared in which a layer of the neckable spunbonded polypropylene material of Example 2 was joined to each side of the elastic meltblown sheet of Example 2 except that the neckable material was not necked.

The neckable spunbonded polypropylene material and the meltblown elastic sheet were joined utilizing a heated bonder roller arrangement. The bonder speed was set at 21 feet per minute, nip pressure was 355 pounds per linear inch, and the calender roller and anvil roller temperatures were set at 127° F. The elastic sheet unwind was set at 21 feet per minute so there would be no tensioning of the elastic web. The neckable spunbonded polypropylene materials were unwound at about 21 feet per minute. No force was applied to brake any of the unwinds. Consequently, the neckable spunbonded materials were not necked and the elastic sheet was not stretched.

The composite elastic material produced in this manner was tested on the Instron Model 1122 Universal Testing Instrument and the results are given in Table 7 under the heading "Composite 3B". When compared to Composite 3A produced with the same materials at the same process conditions except that the spunbonded sheets were necked in for Composite 3A, properties were not changed much except the cross-machine direction elongation was significantly increased.

Example 4

A neckable spunbonded polypropylene material was necked in two stages and then joined to each side of an elastic meltblown sheet utilizing a thermal bonder to produce a composite elastic necked-bonded material.

Two rolls of a neckable spunbonded polypropylene material having a basis weight of about 0.4 osy and an initial width of about 32 inches were wound on a Camachine 10 rewinder made by Cameron Machine Company of Brookland, N.Y. The wind-up roll was operated at a speed of about 42 feet per minute and the unwind roll operated at a speed of about 35 feet per minute causing the material to neck to a width of about 18 inches.

The two rolls of neckable spunbonded polypropylene having a necked width of about 18 inches were run through the "22 inch Face Pilot Coating Line" made by the Black-Clawson Compnay, Fulton, N.Y. The unwind roll was operated at a speed of about 5 feet per minute and the winder operated at a speed of from about 5 to about 8 feet per minute to further neck the spunbonded material to a final width of about 13.5 to about 14 inches. The two rolls of necked spunbonded material were put on the top and bottom positions of a three position roll unwind apparatus. The roll of elastic meltblown sheet from Example 2 was placed on the middle position.

The necked spunbonded material and the elastic meltblown sheet were joined utilizing a heated bonder roller arrangement. The bonder speed was set at 18 feet per minute, nip pressure was 355 pounds per linear inch, and the calender roller and anvil roller temperatures were set at 127° F. The elastic sheet unwind was set at 21 feet per minute so there would be no tensioning of the elastic web. The necked spunbonded material unwinds were set at about 19 feet per minute so that enough tension was created to keep the necked spunbonded material in the necked condition.

The composite elastic necked-bonded material produced in this manner was tested on the Instron Model 1122 Universal Testing Instrument and the results are given in Tables 8 and 9 under the heading "Composite 4". Compared to the elastic sheet, the composite elastic material has lower values for machine direction stretch and Peak Total Energy Absorbed and considerably higher peak load values (Table 8). Cycling values (Table 9) showed little change except at the breaking point of the composite elastic material where the peak load was about 5 times that of the pure elastomer.

Example 5

Composite Elastic Neck-Bonded Material Having a Meltblown Elastic Layer Formed Directly on a Necked Material A neckable spunbonded polypropylene material having a basis weight of about 0.4 osy was unwound from a braked unwind roll at a speed of approximately 16 feet per minute and fed on to the forming drum of a meltblowing apparatus operating at a rate of 20 feet per minute. The difference in speed caused the material to constrict to about 35 percent of its original width.

A pressure sensitive elastomer adhesive web of meltblown fibers having a basis weight of about 40 grams per square meter was formed directly on the tensioned, necked material. The meltblown fibers were formed from a blend of about 63% by weight KRATON G-1657, 20% polyethylene NA-601 and 17% REGALREZ 1126 having a melt flow of about 15 grams per ten minutes when measured at 190° C. and under a 2160 gram load; an elongation of about 750%; a modulus of elongation at 100% of about 175 psi; and a modulus of elongation at 300% of about 225 psi utilizing meltblowing equipment having a 0.090 inch recess and a 0.067 inch air gap die tip arrangement. The meltblowing process equipment operated under the following conditions: die zone temperature about 500° F.; die polymer melt temperature about 493° F.; barrel pressure 320 psig; die pressure 151 psig; polymer throughput 0.9 pounds per hour; forming drum vacuum about 3 inches of water; horizontal forming distance about 12 inches; vertical forming distance about 14 inches and winder speed about 20 feet per minute.

The composite elastic neck-bonded material formed in this manner was tested on an Instron Model 1122 Universal Testing Instrument. The results are reported in Tables 10 and 11 under the heading "Meltblown Laminate."

Comparative Example 5

A neckable spunbonded polypropylene material having a basis weight of about 0.4 osy was joined to an elastic web of meltblown fibers having a basis weight of about 70 grams per square meter utilizing a heated bonder roller arrangement according to the procedure of Example 2. The bonder speed was set at 21 feet per minute, nip pressure was 355 pounds per linear inch, and the calender roller and anvil roller temperatures were set at 127° F. The elastic web unwind was set at 21 feet per minute so that there would be no tensioning of the elastic web. The spunbonded polypropylene web unwind was set at 21 feet per minute but force was applied to the unwind brake so the unwind operated at about 17 feet per minute or about 20 percent slower than the bonder.

The composite elastic necked-bonded material produced in this manner was tested on the Instron Model 1122 Universal Testing Instrument and the results are given in Tables 10 and 11 under the heading "Composite 5".

Because the elastic component of the thermally bonded composite material had a basis weight that was approximately 50 percent greater than the basis weight of the elastic component of the meltblown composite material, the values for Peak Total Energy Absorbed in the Grab Tensile Tests, and the Peak Total Energy Absorbed and Peak Load for cycling are considerably higher than the meltblown composite material. When taken "to Break", the peak loads are similar because of the contribution by the necked spunbonded material.

Example 6

A neckable spunbonded polypropylene material having a basis weight of about 0.4 ounces per square yard and an initial width of about 40 inches was necked to a width of about 19 inches and run under a film extrusion apparatus at a rate of 130 feet per minute. A film was formed from a blend of about 63% by weight KRATON G-1657, 20% polyethylene NA-601 and 17% REGALREZ 1126. Added to the blend was about 2 percent by weight Ampacet White concentrate Type 41171 Titanium Dioxide ($TiO_2$) pigment available from the Ampacet Corporation, Mt. Vernon, N.Y. The blend had a melt flow of about 15 grams per ten minutes when measured at 190° C. and under a 2160 gram load; an elongation of about 750%; a modulus of elongation at 100% of about 175 psi; and a modulus of elongation at 300% of about 225 psi and was extruded on the spunbonded polypropylene web at a rate of about 5.4 pounds per inch per hour. The thickness of the extruded film was about 1 mil.

The composite elastic necked-bonded material produced in this manner was tested on the Instron Model 1122 Universal Testing Instrument and the results are given in Tables 12 and 13 under the heading "Composite 6". The test results of the composite material formed by meltblowing an elastic web onto the tensioned, necked material (Example 5) are also shown in the tables for comparison. The KRATON G film appears to give much more strength to the composite elastic necked-bonded material than the elastic web of meltblown fibers. It can be seen that the values for the cycling Peak Total Energy Absorbed and Peak Load are from 400 to 500 percent greater for the material having the 1 mil extruded elastic film than for the material having a meltblown web. The values measured "to Break" are about 50 to 100 percent greater for the material having the 1 mil extruded film than for the material having a meltblown web.

Example 7

Two neckable webs of spunbonded polypropylene having basis weights of about 0.4 osy were joined to each side of an elastic meltblown web according to the procedure of Comparative Example 3. The neckable material remained unnecked and the resulting composite material was not a composite elastic necked-bonded material. The neckable spunbonded polypropylene material and the composite material were tested on the Instron Model 1122 Universal Testing Instrument and the results are given in Table 14 under the respective headings Control 7A, Control 7B, Composite 7, and Normalized Composite 7.

The test results normalized for the total basis weight show that the composite material formed in this manner is much weaker than the neckable spunbonded materials, that is, Composite 7 versus Control 7A and 7B. However, if the test results are normalized to eliminate the weight contribution of the elastic meltblown web, the test results for the composite material are comparable to the neckable spunbonded materials, that is, Spunbond Normalized Composite 7 versus Control 7A and 7B. In view of these results, the elastic layer makes little contribution to the measured Grab Tensile Test properties of the composite material when the composite material has a maximum elongation that is much less than the elongation of the elastic material.

Film Extrusion Examples

The composite elastic necked-bonded materials of examples 8–20 were made by extruding a film of elastomeric polymer onto at least one tensioned, necked material and immediately applying pressure to bond the film and the tensioned, necked material together.

The samples were cycled on a Sintech 2 computerized system for material testing available from Sintech, Inc. of Stoughton, Mass., and the results reported in Tables 15–17. The jaw faces of the tester were 1 inch by 3 inches so the samples were cut to 3 inch widths. A 4 inch gauge length was used. Crosshead speed was set for 500 millimeters per minute and the unit was zeroed, balanced and calibrated according to the standard procedure. The maximum extension limit for the cycle length was set at 100 percent elongation. The samples were cycled to 100 percent elongation two times and then were taken to 2000 grams load on the third cycle to measure elongation at that particular load. The test equipment was set to report Load in grams force and Elongation in percent. The load results of the cycle tests have been proportionally adjusted for a measured film basis weight of 50 grams per square meter (gsm).

Adhesion between the film and the tensioned, necked material(s) was determined utilizing a conventional cohesion tester equipped with a conventional force gage. Sample size was 2 inches by 4 inches and samples were held in place with Scotch® Brand Double coated Pressure Sensitive #406, 2 inch wide tape. The middle one square inch of the sample was tested. Results of cohesion testing are reported in units of kilograms force per one square inch.

Examples 8–12

Two reversibly necked spunbonded polypropylene webs were unwound from separate supply rolls. One web had a basis weight of about 43 grams per square meter. The other web had a basis weight of about 47 grams per square meter. The reversibly necked spunbonded polypropylene webs were pre-necked and heat treated so the webs would maintain their necked condition. Both webs were adapted to stretch about 150 percent in the cross-machine direction (i.e., to about 250 percent of their unstretched necked width).

The webs were continuously advanced in a configuration such that they would intersect and create a contact zone. This contact zone was located just below a conventional film extrusion apparatus. The apparatus included a 3.5 inch single screw extruder available from Hexco, Inc. of Addison, Ill. The extruder was equipped with an Ultraflex H-40 extrusion die available form Extrusion Dies, Chippewa Falls, Wis. The die lip opening was set at 20 mil. The distance between the die tip and the contact zone was set so that the extruded film contacted the tensioned, necked material in less than about 1 second at conventional extrusion rates.

A film was formed from a blend of about 63% by weight KRATON G-1657, 20% polyethylene NA-601 and 17% REGALREZ 1126. The extruder was operated so that the deposited film had a basis weight of about 50 grams per square meter. The two webs of tensioned, necked material sandwiched the extruded film forming a multilayer material. The multilayer material immediately passed into the pressure nip formed by two pressure rolls. One pressure roll was rubber coated. The other roll was chilled to a temperature of about 50° F. Both of the rolls were smooth. All of the Examples were prepared utilizing the smooth rolls. The basis weight of the elastic film in Example 8 was 47 gsm.

A single layer of nine (9) mil tape was wrapped on each edge of the rubber coated roll to create a small gap between the pressure rolls. Generally speaking, the gap was less than 9 mils due to compression of the tape and of the rubber roll. Example 9 was prepared according to the procedure described above and utilizing the single wrap of tape on the rubber pressure roll. The basis weight of the elastic film in Example 9 was 50 gsm.

A second layer of nine (9) mil tape was wrapped on each edge of the rubber coated roll to create a larger gap. Generally speaking, the gap was less than 18 mils (i.e., 2 layers of 9 mil tape) due to compression of the tape and of the rubber roll. Example 10 was prepared according to the procedure described above and utilizing the double wrap of tape on the rubber pressure roll. The basis weight of the elastic film in Example 10 was 47 gsm.

A third layer of nine (9) mil tape was wrapped on each edge of the rubber coated roll to create a larger gap. Generally speaking, the gap was less than 27 mils (i.e., 3 layers of 9 mil tape) due to compression of the tape and of the rubber roll. Example 11 was prepared according to the procedure described above and utilizing the triple wrap of tape on the rubber pressure roll. The basis weight of the elastic film in Example 11 was 48 gsm.

A fourth layer of nine (9) mil tape was wrapped on each edge of the rubber coated roll to create a larger gap. Generally speaking, the gap was less than 36 mils (i.e., 4 layers of 9 mil tape) due to compression of the tape and of the rubber roll. Example 12 was prepared according to the procedure described above and utilizing the quadruple wrap of tape on the rubber roll. The basis weight of the elastic film in Example 12 was 48 gsm.

The composite elastic necked-bonded materials produced for Examples 8–14 were tested on the Sintech Instrument and the results are given in Table 15 at 30 percent elongation on the first cycle pull.

Examples 13–14

Composite elastic necked-bonded materials were prepared according to the procedure described for Examples 8–12 except that a controlled gap was created between the pressure rolls utilizing two set screws. The gap setting between the pressure roll was maintained by applying pressure to each of the two closing arms that move one of the pressure rolls towards the other. The gap setting was measured at each end of the pressure rolls utilizing feeler gages.

The basis weight of the elastic film in Example 13 was 46 gsm. The basis weight of the elastic film in Example 14 was 47 gsm.

The composite elastic necked-bonded materials produced for Examples 13 and 14 were tested on the Sintech Instrument and the results are given in Table 16.

Examples 15–20

Composite elastic necked-bonded materials were prepared according to the procedure described for Examples 13–14 except that the reversibly necked spunbonded polypropylene webs each had a basis weight of about 41 grams per square meter and were adapted to stretch about 110 percent in the cross-machine direction (i.e., to about 210 percent of their necked width).

The basis weight of the elastic film in Example 15–20 were as follows:

| EXAMPLE | BASIS WEIGHT (gsm) KRATON ® FILM |
|---------|-----------------------------------|
| 15 | 47.5 |
| 16 | 51.3 |
| 17 | 51.3 |
| 18 | 44.6 |
| 19 | 51.3 |
| 20 | 51.3 |

The composite elastic necked-bonded materials produced for Examples 15–20 were tested on the Sintech Instrument and the results are given in Table 17.

As can be seen from Tables 15–17, Example 8 was prepared utilizing a pressure roll arrangement with a pressurized nip such that the rolls were essentially in contact in the absence of material. Load (measured in grams force) on the first pull to 30% stretch was significantly higher than the loads measured for material prepared when an appreciable controlled gap was maintained between the pressure rollers. Generally speaking, the response of the composite elastic necked-bonded material to an elongation force was changed by adjusting the gap setting between the pressure rollers.

Figure 9:
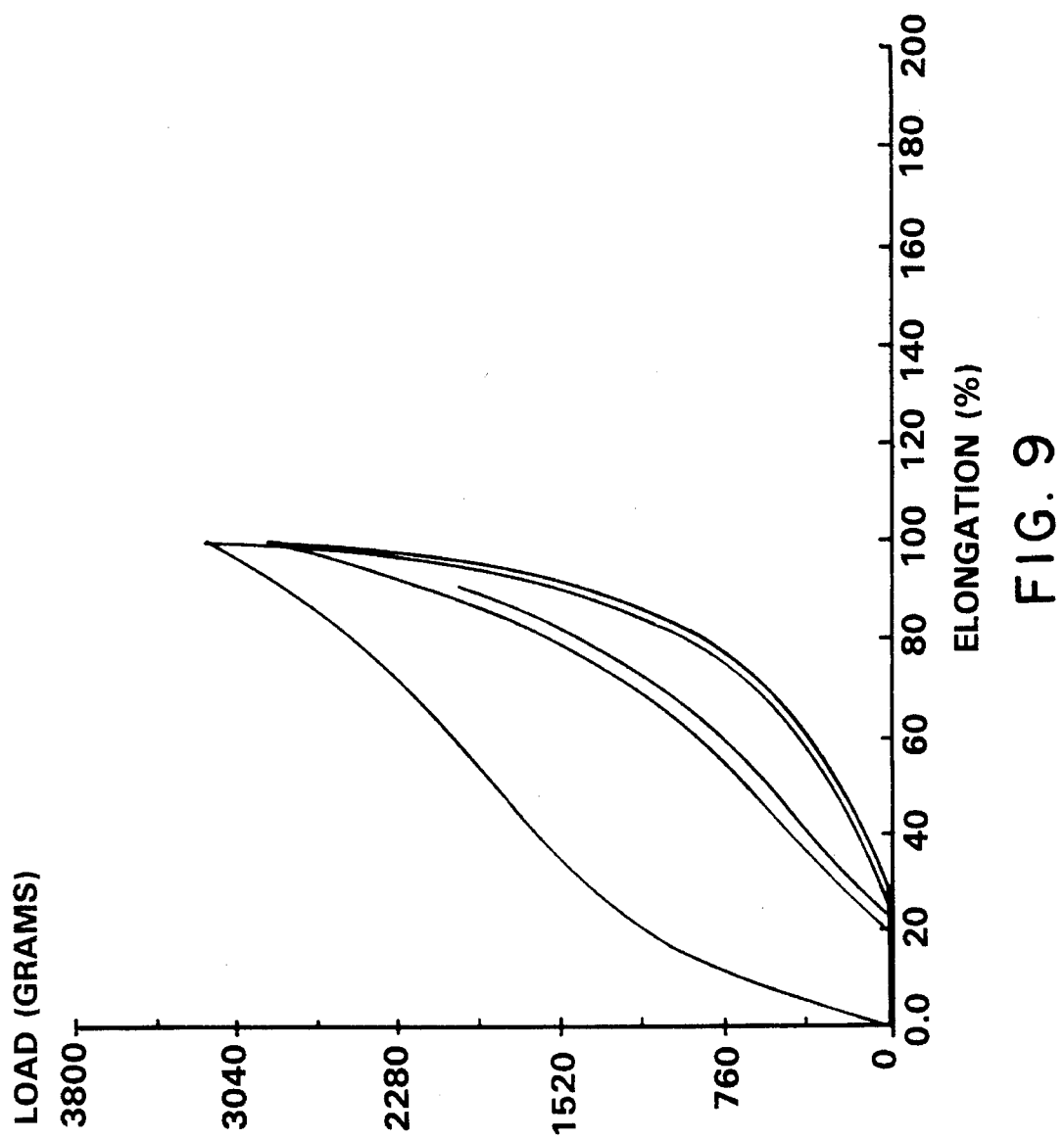
FIG. 9 is a representation of an exemplary stress-strain curve for a composite elastic necked-bonded material.
Figure 10:
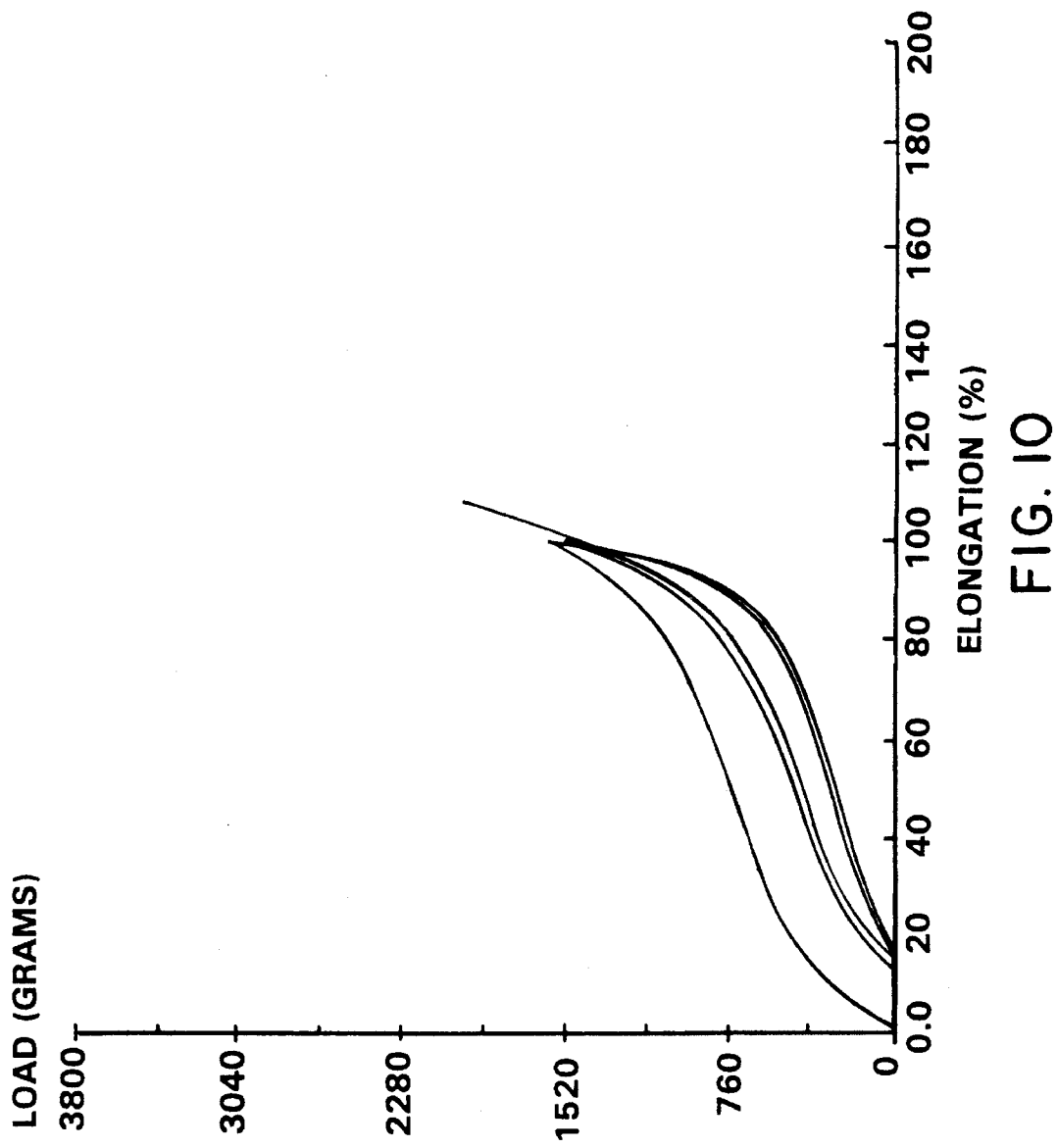
FIG. 10 is a representation of an exemplary stress-strain curve for a composite elastic necked-bonded material.
Figure 11:
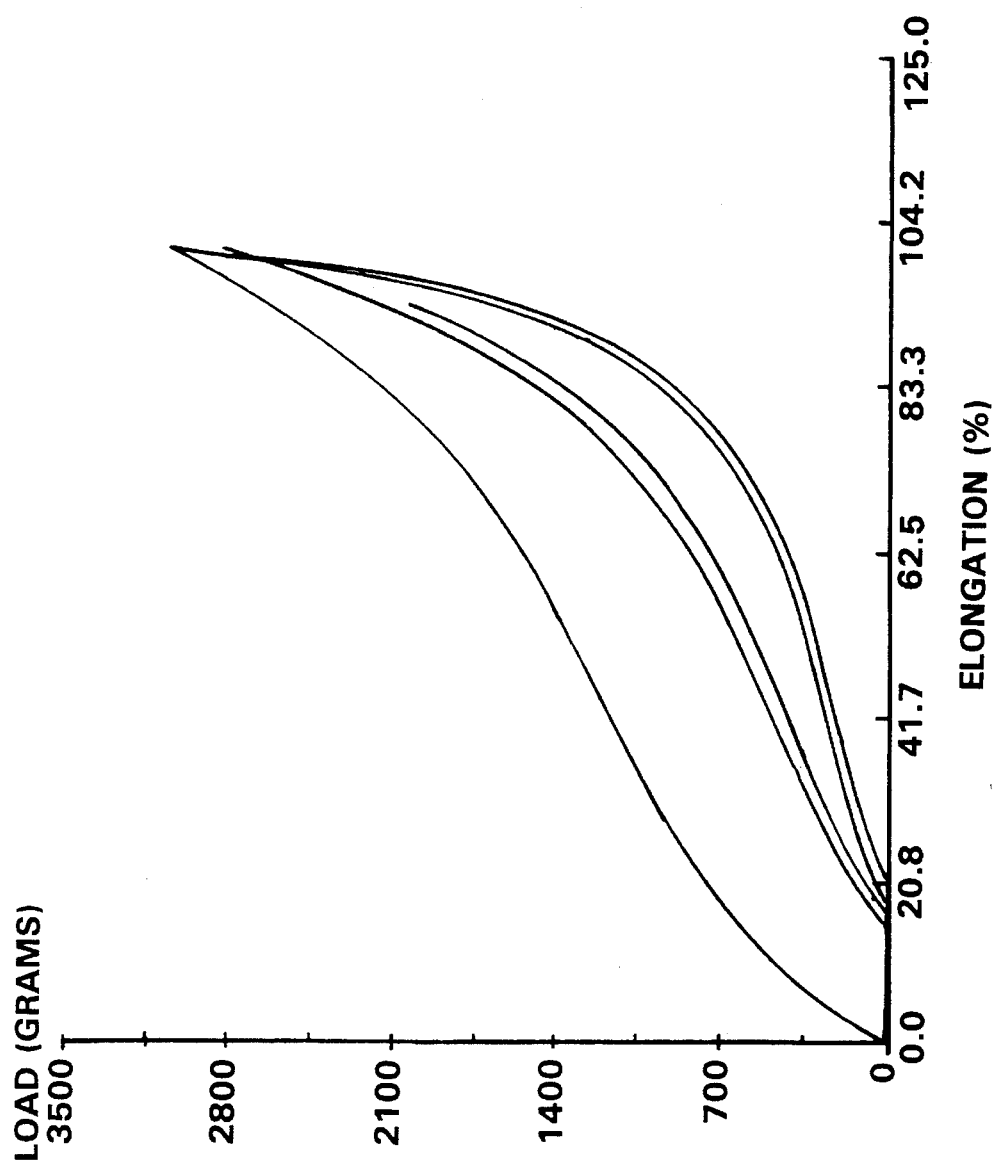
FIG. 11 is a representation of an exemplary stress-strain curve for a composite elastic necked-bonded material.
Figure 12:
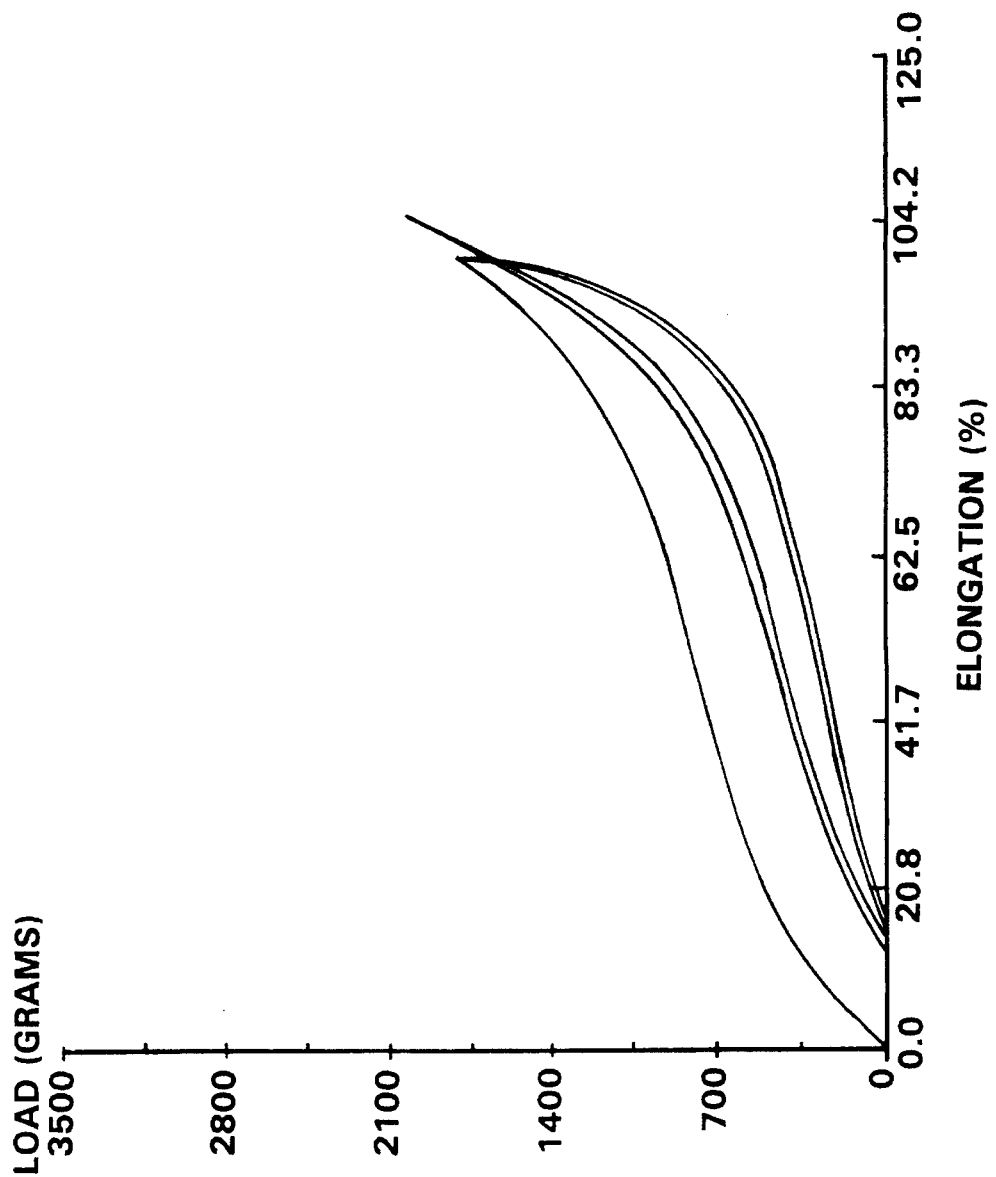
FIG. 12 is a representation of an exemplary stress-strain curve for a composite elastic necked-bonded material.

For example, FIG. 9 represents a stress-strain curve (hysteresis loop) measured for Example 8 which was prepared with a pressurized nip set so there was essentially no gap. FIG. 10 represents a stress-strain curve measured for Example 14 which was prepared utilizing a 25 mil gap setting. A comparison of FIG. 9 with FIG. 10 reveals lower levels of load (i.e., stress) during elongation for the material prepared utilizing a 25 mil gap setting. FIG. 11 represents a stress-strain curve measured for Example 15 which was prepared utilizing a 10 mil gap setting. FIG. 12 represents a stress-strain curve measured for Example 19 which was prepared utilizing a 35 mil gap setting. A comparison of FIG. 9 with FIGS. 11 and 12 reveals lower levels of load (i.e., stress) during elongation for the materials prepared utilizing gap settings of 10 mil and 35 mil.

The change in response of the composite elastic necked-bonded material to an elongation force caused by adjusting the gap setting between the pressure rollers is further highlighted in Table 18. Data in Table 18 show a comparison between the load (i.e. force) measured during the first pull to 30% stretch for samples prepared at various gap settings. As can be seen, increasing the gap setting generally decreased the load measured during the first pull to 30% stretch by about 20%, 40%, even 50% or more. The data also show that decreasing the gap setting generally increased the load measured during the first pull to 30% stretch. For example, the load measured during the first pull to 30% stretch for Example 8 is over twice as great as that measured for Example 19.

RELATED APPLICATIONS

This application is one of a group of commonly assigned patent applications which are being filed on the same date. The group includes application Ser. No. 07/249,050 (U.S. Pat. No. 4,965,122) in the name of Michael T. Morman and entitled "Reversibly Necked Material and Process to Make It"; and application Ser. No. 07/248,833 (U.S. Pat. No. 4,981,747) entitled "Composite Elastic Material INcluding a Reversibly Necked Material" and also in the name of Michael T. Morman. The subject matter of these applications is hereby incorporated herein by reference.

Disclosure of the presently preferred embodiment of the invention is intended to illustrate and not to limit the invention. It is understood that those of skill in the art should be capable of making numerous modifications without departing from the true spirit and scope of the invention.

TABLE 1

GRAB TENSILES:

|  | Control 1 | Heat Set |
|---|---|---|
| MD TEA | 1.05 ± .11 | .25 ± .02 |
| MD Peak Load | 15.8 ± 1.25 | 12 ± 3 |
| MD Elong | 46 ± 2 | 16 ± 1 |
| CD TEA | .89 ± .22 | .26 ± .06 |
| CD Peak Load | 13.2 ± 1.9 | 3.7 ± .6 |
| CD Elong | 50 ± 7 | 143 ± 10 |

|  | Elastomer 1 | Composite 1 |
|---|---|---|
| MD TEA | 1.22 ± .13 | .13 ± .03 |
| MD Peak Load | 1.36 ± .09 | 2.8 ± .24 |
| MD Elong | 581 ± 40 | 30 ± 3 |
| CD TEA | .84 ± .2 | .32 ± .04 |
| CD Peak Load | .93 ± .12 | 1.66 ± .22 |
| CD Elong | 574 ± 95 | 204 ± 11 |

TABLE 2

| CYCLE: | 1 | 2 | 3 | 4 | To Break |
|---|---|---|---|---|---|
| Control 1, Cycled in the cross-machine direction at 38% CD elongation | | | | | |
| Peak TEA | .932 ± .02 | .28 ± .01 | .24 ± .005 | .21 ± .01 | .50 ± .26 |
| Peak Load | 13.8 ± 2 | 11.8 ± .3 | 11.0 ± .1 | 10.4 ± .3 | 13.8 ± 1.7 |
| Perm. Set | 45. ± 3 | 49 ± 2 | 53 ± 1 | 55 ± 1 | 45 ± 4 |
| Heat Set, Cycled in the cross-machine direction at 80% CD elongation | | | | | |
| Peak TEA | .014 ± .001 | .004 ± .001 | .002 ± .001 | .002 ± .001 | .37 ± .12 |
| Peak Load | .21 ± .01 | .19 ± .01 | .18 ± .01 | .18 ± .01 | 4.06 ± .65 |
| Perm. Set | 22 ± 1 | 25 ± 1 | 28 ± 1 | 37 ± 3 | 143 ± 7 |

TABLE 2-continued

| CYCLE: | 1 | 2 | 3 | 4 | |
|---|---|---|---|---|---|
| Composite 1, Cycled in the cross-machine direction at 109% CD elongation ||||||
| Peak TEA | .10 ± .01 | .06 ± .005 | .06 ± .005 | .053 ± .005 | .285 ± .04 |
| Peak Load | .528 ± .08 | .48 ± .06 | .47 ± .05 | .46 ± .06 | 1.69 ± .2 |
| Perm. Set | 9 ± 1 | 10 ± .5 | 11.2 ± 1 | 11.4 ± 3 | 176 ± 12 |
| Elastomer 1, Cycled in the cross-machine direction at 109% CD elongation ||||||
| | | | | | To 176% |
| Peak TEA | .076 ± .001 | .056 ± .001 | .054 ± .001 | .052 ± .001 | .13 ± .01(N = 2 |
| Peak Load | .344 ± .004 | .33 ± .004 | .32 ± .003 | .317 ± .004 | .43 ± .01(N = 2 |
| Perm. Set | 8 ± 0 | 9 ± 0 | 10 ± 0 | 10.8 ± .4 | |

TABLE 3

| GRAB TENSILES: | | | |
|---|---|---|---|
| | Control 2 | Composite 2 | Elastomer 2 |
| MD TEA | .96 ± .24 | .35 ± .05 | 1.12 ± .34 |
| MD Peak Load | 15.2 ± 2.75 | 4.57 ± .2 | 1.54 ± .17 |
| MD Elong | 42.5 ± 6 | 50 ± 5 | 427 ± 93 |
| CD TEA | 1.08 ± .38 | .54 ± .15 | .83 ± .03 |
| CD Peak Load | 14.1 ± 2.7 | 2.45 ± .3 | 1.22 ± .05 |
| CD Elong | 53 ± 8 | 217 ± 23 | 407 ± 17 |

TABLE 4

| CYCLE: | 1 | 2 | 3 | 4 | |
|---|---|---|---|---|---|
| Elastomer 2, Cycled in the cross-machine direction at 129% CD elongation ||||||
| | | | | | To 235% |
| Peak TEA | .17 ± .006 | .11 ± .004 | 10 ± .004 | .10 ± .004 | .33 ± .03 |
| Peak Load | .60 ± .02 | .55 ± .02 | .54 ± .02 | .53 ± .02 | .765 ± .06 |
| Perm. Set | 8 ± 0 | 10 ± .5 | 11 ± .5 | 13 ± 2 | |
| Composite 2, Cycled in the cross-machine direction at 122% CD elongation ||||||
| | | | | | To Break |
| Peak TEA | .154 ± .02 | .086 ± .01 | 0.78 ± .01 | .074 ± .005 | .72 ± .15 |
| Peak Load | .96 ± .26 | .854 ± .21 | .82 ± .21 | .79 ± .20 | 2.74 ± .38 |
| Perm. Set | 9 ± 1 | 11 ± 1 | 13 ± 2 | 14 ± 2 | 218 ± 24 |

TABLE 5

| GRAB TENSILES: | | | |
|---|---|---|---|
| | Control 5 | Composite 3A | Elastomer 2 |
| MD TEA | .96 ± .24 | .34 ± .06 | 1.12 ± .34 |
| MD Peak Load | 15.2 ± 2.75 | 4.7 ± .6 | 1.54 ± .17 |
| MD Elong | 42.5 ± 6 | 55 ± 4 | 427 ± 93 |
| CD TEA | 1.08 ± 0.38 | .48 ± .08 | .83 ± .03 |
| CD Peak Load | 14.1 ± 2.7 | 4.3 ± .4 | 1.22 ± .05 |
| CD Elong | 53 ± 8 | 97 ± 8 | 407 ± 17 |

TABLE 6

| CYCLE: | 1 | 2 | 3 | 4 | |
|---|---|---|---|---|---|
| Elastomer 2, Cycled in the cross-machine direction at 60% CD elongation | | | | | |
| | | | | | To 90% |
| Peak TEA | .067 ± .002 | .048 ± .002 | .046 ± .001 | .045 ± .002 | .103 ± .002 |
| Peak Load | .553 ± .01 | .517 ± .012 | .50 ± .01 | .50 ± .01 | .65 ± .01 |
| Perm. Set | 7 ± 0 | 8 ± 0 | 8 ± 0 | 9 ± 1 | |
| Composite 3A, Cycled in the cross-machine direction at 55% CD elongation | | | | | |
| | | | | | To Break |
| Peak TEA | 19 ± .04 | .082 ± .02 | .07 ± .01 | .065 ± .01 | .484 ± .06 |
| Peak Load | 2.66 ± .35 | 2.37 ± .33 | 2.24 ± .31 | 2.16 ± .28 | 4.08 ± .35 |
| Perm. Set | 18 ± 1 | 20 ± 2 | 22 ± 3 | 24 ± 2 | 91 ± 4 |

TABLE 7

| GRAB TENSILES: | | |
|---|---|---|
| | Composite 3B | Composite 3A |
| MD TEA | .43 ± .07 | .34 ± .06 |
| MD Peak Load | 5.8 ± .51 | 4.7 ± .6 |
| MD Elong | 52 ± 6 | 55 ± 4 |
| CD TEA | .41 ± .09 | .48 ± .08 |
| CD Peak Load | 5.25 ± .75 | 1.3 ± .4 |
| CD Elong | 55 ± 5 | 97 ± 8 |

TABLE 8

| GRAB TENSILES: | | |
|---|---|---|
| | Elastomer 2 | Composite 4 |
| MD TEA | 1.12 ± .34 | .33 ± .06 |
| MD Peak Load | 1.54 ± .17 | 5.8 ± .49 |
| MD Elong | 427 ± 93 | 48 ± 4 |
| CD TEA | .83 ± .03 | .60 ± .09 |
| CD Peak Load | 1.22 ± .05 | 3.1 ± .5 |
| CD Elong | 407 ± 17 | 229 ± 12 |

TABLE 9

| CYCLE: | 1 | 2 | 3 | 4 | |
|---|---|---|---|---|---|
| Elastomer 2, Cycled in the cross-machine direction at 129% CD elongation | | | | | |
| | | | | | To 235% |
| Peak TEA | .17 ± .006 | .11 ± .004 | .10 ± .004 | .10 ± .004 | .33 ± .03 |
| Peak Load | .60 ± .02 | .55 ± .02 | .54 ± .02 | .53 ± .02 | .76 ± .06 |
| Perm. Set | 8 ± 0 | 10 ± 1 | 11 ± 1 | 13 ± 2 | |
| Composite 4, Cycled in the cross-machine direction at 129% CD elongation | | | | | |
| | | | | | To Break |
| Peak TEA | .175 ± .025 | .08 ± .01 | .07 ± .004 | .07 ± .004 | .85 ± .07 |
| Peak Load | .89 ± .2 | .77 ± .2 | .71 ± .16 | .69 ± .14 | 3.60 ± .5 |
| Perm. Set | 13 ± 1 | 15 ± 1 | 15 ± 1 | 18 ± 1 | 235 ± 14 |

TABLE 10

| GRAB TENSILES: | | |
|---|---|---|
| | Composite 5 | Meltblown Laminate |
| MD TEA | .35 ± .05 | .17 ± .04 |
| MD Peak Load | 4.57 ± .21 | 4.3 ± .35 |
| MD Elong | 50 ± 5 | 24 ± 3 |
| CD TEA | .54 ± .15 | .38 ± .03 |
| CD Peak Load | 2.45 ± .31 | 2.4 ± .2 |
| CD Elong | 217 ± 23 | 210 ± 10 |

TABLE 11

| CYCLE: | 1 | 2 | 3 | 4 | To Break |
|---|---|---|---|---|---|
| Composite 5, Cycled in the cross-machine direction at 122% CD elongation ||||||
| Peak TEA | .154 ± .02 | .086 ± .01 | .078 ± .008 | .074 ± .005 | .719 ± .15 |
| Peak Load | .96 ± .26 | .35 ± .21 | .82 ± .21 | .80 ± .20 | 2.74 ± .4 |
| Perm. Set | 9 ± 1 | 11 ± 1 | 13 ± 2 | 14 ± 2 | 218 ± 24 |
| Meltblown Laminate, Cycled in the cross-machine direction at 119% CD elongation ||||||
| Peak TEA | .089 ± .01 | .051 ± .005 | .047 ± .004 | .045 ± .004 | .512 ± .064 |
| Peak Load | .429 ± .04 | .379 ± .04 | .36 ± .03 | .35 ± .03 | 2.5 ± .14 |
| Perm. Set | 10 ± 1 | 12 ± 1 | 13 ± 1 | 19 ± 6 | 218 ± 10 |

TABLE 12

| | GRAB TENSILES: | |
|---|---|---|
| | Meltblown Laminate | Composite 6 |
| MD TEA | .17 ± .04 | .28 ± .08 |
| MD Peak Load | 4.3 ± .35 | 5.7 ± .4 |
| MD Elong | 24 ± 3 | 34 ± 7 |
| CD TEA | .38 ± .03 | .96 ± .13 |
| CD Peak Load | 2.4 ± .2 | 3.9 ± .3 |
| CD Elong | 210 ± 10 | 215 ± 16 |

TABLE 13

| CYCLE: | 1 | 2 | 3 | 4 | To Break |
|---|---|---|---|---|---|
| Meltblown Laminate 1, Cycled in the cross-machine direction at 119% CD elongation ||||||
| Peak TEA | .09 ± .01 | .051 ± .005 | .047 ± .004 | .045 ± .004 | .51 ± .06 |
| Peak Load | .43 ± .04 | .38 ± .03 | .36 ± .03 | .35 ± .03 | 2.50 ± .14 |
| Perm. Set | 10 ± 1 | 12 ± 1 | 13 ± 1 | 19 ± 6 | 219 ± 10 |
| Composite 6, Cycled in the cross-machine direction at 121% CD elongation ||||||
| Peak TEA | .436 ± 0.3 | .214 ± .01 | .20 ± .01 | .19 ± .01 | .93 ± .11 |
| Peak Load | 1.98 ± .3 | 1.80 ± .29 | 1.72 ± .29 | 1.67 ± .28 | 3.84 ± .21 |
| Perm. Set | 10 ± 1 | 11 ± 1 | 12 ± 1 | 13 ± 1 | 196 ± 15 |

TABLE 14

| | GRAB TENSILES: | |
|---|---|---|
| | Control 7A | Control 7B |
| MD TEA | .88 ± .26 | 1.05 ± .2 |
| MD Peak Load | 15.9 ± 4 | 14.5 ± 2 |
| MD Elong | 37 ± 5 | 48 ± 7 |
| CD TEA | .90 ± .36 | 1.25 ± .4 |
| CD Peak Load | 12.7 ± 3 | 15.5 ± 2.6 |
| CD Elong | 51 ± 8 | 55 ± 8 |
| | Composite 7 | Spunbond Normalized Composite 7 |
| MD TEA | .43 ± .07 | 1.33 ± .22 |
| MD Peak Load | 5.8 ± .51 | 18 ± 1.58 |
| MD Elong | 52 ± 6 | — |
| CD TEA | .41 ± .09 | 1.27 ± .28 |
| CD Peak Load | 5.25 ± .75 | 16.3 ± 2.3 |
| CD Elong | 55 ± 5 | — |
| | Elastomer 2 | |
| MD TEA | 1.12 ± .34 | |
| MD Peak Load | 1.54 ± .17 | |
| MD Elong | 427 ± 93 | |
| CD TEA | .83 ± .03 | |
| CD Peak Load | 1.22 ± .05 | |

TABLE 15

| Example No. | Elongation @ 2000 g Load(%) | Load (g) 1st Pull to 30% Elongation | No. of Wraps of 9 mil Tape on Edges of Rubber Roll |
|---|---|---|---|
| 8 | 93 | 1277 | 0 |
| 9 | 92 | 1317 | 1 |
| 10 | 93 | 1291 | 2 |
| 11 | 96 | 1053 | 3 |
| 12 | 100 | 839 | 4 |

TABLE 16

| Example No. | Elongation @ 2000 g Load(%) | Load (g) 1st Pull to 30% Elongation | Gap Setting (Mils) |
|---|---|---|---|
| 8 | 93 | 1277 | 0 |
| 13 | 104 | 738 | 15 |
| 14 | 108 | 646 | 25 |

TABLE 17

| Example No. | Elongation @ 2000 g Load(%) | Load (g) 1st Pull to 30% Elongation | Gap Setting (Mils) | Adhesion Kg per 1 in$^2$ |
| --- | --- | --- | --- | --- |
| 8 | 93 | 1277 | 0 | — |
| 15 | 94 | 1027 | 10 | 9.7 |
| 16 | 98 | 750 | 19 | 8.2 |
| 17 | 102 | 637 | 25 | 7.7 |
| 18 | 101 | 761 | 30 | 7.5 |
| 19 | 105 | 610 | 35 | 7.3 |
| 20 | 104 | 677 | 40 | 7.4 |

TABLE 18

| Example No. | Load (g) 1st Pull to 30% Stretch | Load loss from Example 8 (percent) | Gap Setting (Mils) |
| --- | --- | --- | --- |
| 8 | 1277 | — | 0 |
| 15 | 1027 | 19.6 | 10 |
| 16 | 750 | 41.2 | 19 |
| 17 | 637 | 50.1 | 25 |
| 18 | 761 | 40.4 | 30 |
| 19 | 610 | 52.2 | 35 |
| 20 | 677 | 46.9 | 40 |

What is claimed is:

1. A composite elastic necked bonded material produced by a method comprising the steps of:

providing a continuously advancing tensioned, necked material; extruding a film of substantially molten elastomer through a die tip;

depositing the extruded elastomeric film onto the tensioned, necked material within from about 0.1 to about 1 second of exiting the die tip to form a multilayer material; and immediately applying pressure to the multilayer material to bond the tensioned, necked material to the elastomeric film.

2. A composite elastic necked bonded material produced by a method comprising the steps of:

providing a first and second continuously advancing sheet, each sheet comprising at least one tensioned, necked material and each sheet advancing in intersecting relationship to form a contact zone;

extruding a film of substantially molten elastomer through a die tip between the first and second continuously advancing sheet of tensioned, necked material so that the extruded elastomeric film is deposited into the contact zone between the tensioned, necked materials within from about 0.1 to about 1 second of exiting the die tip to form a multilayer material; and immediately applying pressure to the multilayer material to bond each tensioned, necked material to the elastomeric film.

3. A composite elastic necked bonded material produced by a method comprising the steps of:

providing a first and second continuously advancing sheet of at least one tensioned, necked material, each sheet comprising at least one tensioned, necked material and each sheet advancing in intersecting relationship to form a contact zone;

extruding a film of substantially molten pressure sensitive elastomer adhesive through a die tip between the first and second continuously advancing sheet of tensioned, necked material so that the extruded pressure sensitive elastomer adhesive film is deposited into the contact zone between the tensioned, necked materials within from about 0.1 to about 1 second of exiting the die tip to form a multilayer material; and immediately applying pressure to the multilayer material utilizing a pressure roll arrangement comprising at least a first roll, a second roll and a controlled gap, wherein the controlled gap between the first and second rolls of the pressure roll arrangement is set so that the force required to extend the resulting composite elastic material on the first pull is at least about 25 percent less than the force required to extend an identical composite elastic material prepared in an identical pressure roll arrangement with a pressurized nip such that the rolls are essentially in contact in the absence of material.

\* \* \* \* \*